(12) United States Patent
Matsuzaki

(10) Patent No.: US 7,903,872 B2
(45) Date of Patent: Mar. 8, 2011

(54) IMAGE-PROCESSING APPARATUS AND METHOD, COMPUTER PROGRAM, AND STORAGE MEDIUM

(75) Inventor: Masanori Matsuzaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 11/756,292

(22) Filed: May 31, 2007

(65) Prior Publication Data

US 2007/0297668 A1      Dec. 27, 2007

(30) Foreign Application Priority Data

Jun. 23, 2006   (JP) .................................. 2006-174135

(51) Int. Cl.
*G06K 9/00*   (2006.01)
(52) U.S. Cl. ........................................ 382/163; 382/162
(58) Field of Classification Search .................. 382/162, 382/163, 167, 260, 261, 319; 358/1.9, 518, 358/464, 517, 530, 537; 348/580; 399/231, 399/326
See application file for complete search history.

(56) References Cited

U.S. PATENT DOCUMENTS

| | | | | |
|---|---|---|---|---|
| 5,978,506 A | * | 11/1999 | Murayama et al. | 382/162 |
| 6,122,441 A | * | 9/2000 | Tsuji | 358/1.9 |
| 7,085,413 B2 | * | 8/2006 | Huang et al. | 382/163 |
| 7,742,194 B2 | * | 6/2010 | Fujiwara | 358/1.9 |

FOREIGN PATENT DOCUMENTS

| | | |
|---|---|---|
| JP | 5-63968 A | 3/1993 |
| JP | 07-264409 A | 10/1995 |

* cited by examiner

*Primary Examiner* — Anh Hong Do
(74) *Attorney, Agent, or Firm* — Canon U.S.A., Inc. I.P. Division

(57) ABSTRACT

An image-processing apparatus configured to perform a background-color-removal process on color image data. The image-processing apparatus includes a determination unit configured to determine whether a pixel value of the color image data is highlight information to be reproduced using a light color material, and also includes a processing unit configured to perform a background-color-removal process, using a highlight background color level, on a pixel having a pixel value determined by the determination unit to be the highlight information, and to perform a background-color-removal process, using a background color level that is lower in luminance than the highlight background color level, on a pixel having a pixel value determined not to be the highlight information.

12 Claims, 18 Drawing Sheets

IMAGE-PROCESSING APPARATUS AND METHOD, COMPUTER PROGRAM, AND STORAGE MEDIUM

BACKGROUND OF THE INVENTION

1. Field of the Invention

The present invention relates to an image-processing apparatus and method, a computer program, and a storage medium. More particularly, the present invention relates to image processing adapted to perform a background-color-removal process on an image.

2. Description of the Related Art

Generally, various image processes are performed in a copying operation of a digital color copying machine to faithfully reproduce an image of an original read by a scanner. Usually, most of sheets of paper on which the original is printed, that is, most of background color portions are not pure white in color and are slightly colored. Thus, in a case where the original is copied without modification, even the background color portion is faithfully reproduced using a color material. This phenomenon has various adverse effects, for example, an increase of waste of the color material.

A conventional method of eliminating the adverse effects has been known, in which the following optimal image processing is performed according to a color of the background color portion of an image of an original. That is, first, a luminance histogram (or a density histogram) of the image read by a scanner is generated. Subsequently, a signal level (hereunder referred to as a background color level) representing the background color portion of the image of the original is detected according to the histogram. Then, a process (hereunder referred to as a background-color-removal process) of removing the background color portion from the image of the original is performed by subtracting the background color level from a level of a signal representing the image of the original (see, for example, Japanese Patent Application Laid-Open No. 5-63968).

However, the foregoing conventional method has drawbacks in that when the background-color-removal process is performed, a signal value representing highlight data, which corresponds to a portion other than the background color portion, is changed, and in that, particularly, in a case where a printing unit of a copying machine performs spot color printing using light cyan and light magenta, a highlight portion, which should be printed in light cyan or light magenta, is removed by performing the background-color-removal process. Also, in a case where the background color level is set in a high luminance range, and where reproducibility of highlight data is prioritized, the foregoing conventional method has another drawback in that the removal of the background color portion is insufficient relative to the amount of a consumed color material.

SUMMARY OF THE INVENTION

The present invention is directed to achievement of removal of a background color portion without losing the reproducibility of highlight information included in color image data when performing a background-color-removal process on the color image data including the highlight information.

According to an aspect of the present invention, an image-processing apparatus is configured to perform a background-color-removal process on color image data. The image-processing apparatus includes a determination unit configured to determine whether a pixel value of the color image data is highlight information to be reproduced using a light color material, and also includes a processing unit configured to perform a background-color-removal process, using a highlight background color level, on a pixel having a pixel value determined by the determination unit to be the highlight information, and to perform a background-color-removal process, using a background color level that is lower in luminance than the highlight background color level, on a pixel having a pixel value determined not to be the highlight information.

According to an exemplary embodiment of the present invention, when performing a background-color-removal process on color image data including highlight information, a background color can be removed without losing reproducibility of the highlight information included in the color image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

A color multifunction peripheral (MFP) having a scanning function and a printing function according to a first exemplary embodiment of the present invention is described below. The first exemplary embodiment can be applied to, for example, a color copying machine having only a copying function.

Figure 1:
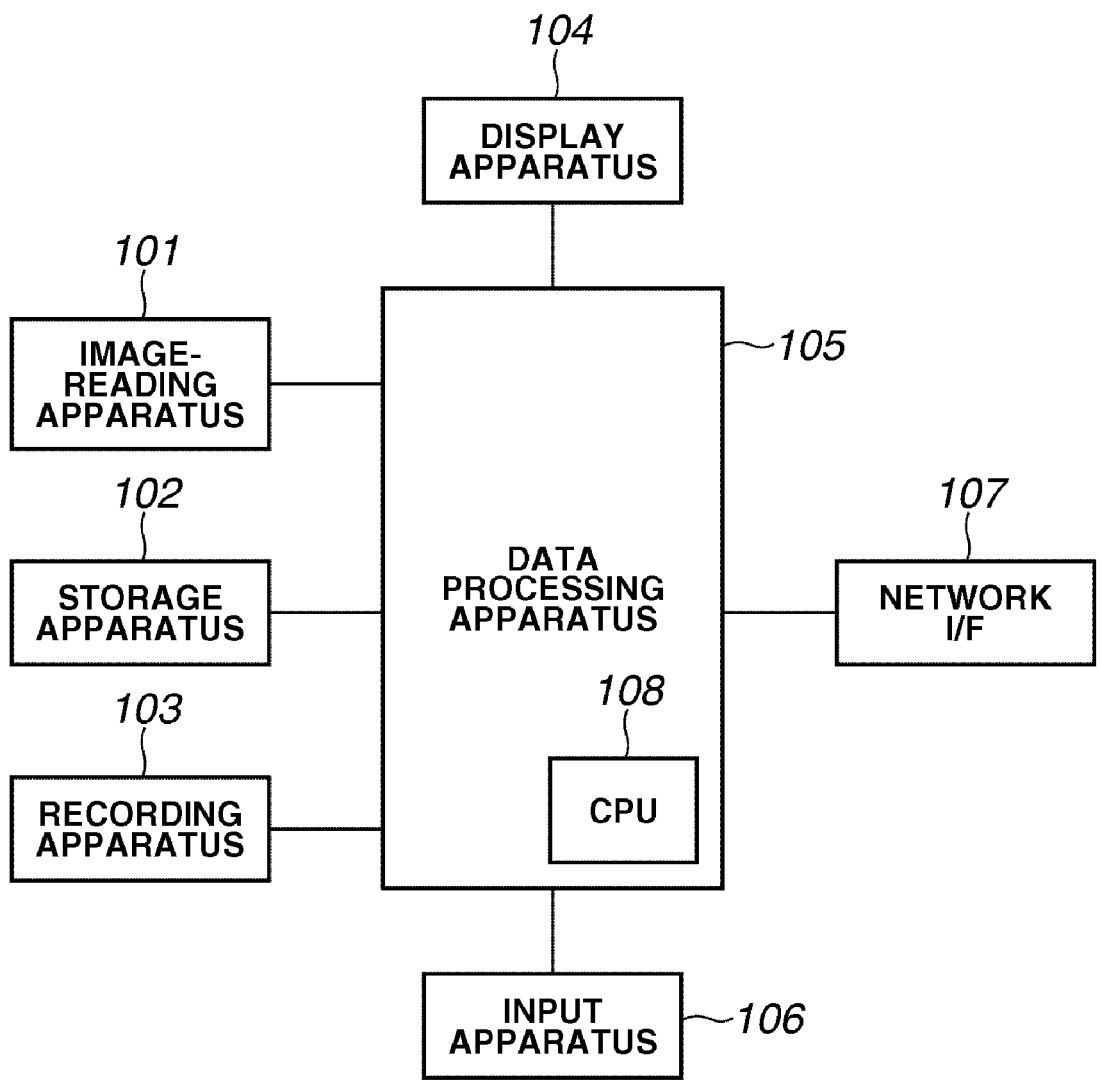
FIG. 1 illustrates a configuration of a color multifunction peripheral according to an exemplary embodiment of the present invention.

FIG. 1 illustrates a configuration of the color MFP. The color MFP includes a data processing apparatus 105, and also includes an image-reading apparatus 101, a storage apparatus 102, a recording apparatus 103, a display apparatus 104, an input apparatus 106, and a network interface (I/F) 107, which are connected to the data processing apparatus 105.

The image-reading apparatus 101 is a scanner. An image of an original is illuminated with light from a light source (not shown). A reflection image of the original is formed by a lens on a solid-state image sensor. A raster-like image-reading signal is obtained from the solid-state image sensor as a signal representing image information. The storage apparatus 102 is a memory, such as a read-only memory (ROM) or a random access memory (RAM), which stores image data read by the image-reading apparatus 101. The recording apparatus 103 is a printer that prints an image on a recording medium, such as paper, using spot colors, such as light cyan, light magenta, red (R), green (G), and blue (B) in addition to cyan (C), magenta (M), yellow (Y), and black (K). The display apparatus 104 is a monitor, such as a cathode-ray tube (CRT), and displays information representing an operation input state and an image which is being processed. The data processing apparatus 105 contains a central processing unit (CPU) 108. The CPU 108 controls image processing in the present exemplary embodiment. The input apparatus 106 is a mouse or a keyboard. The network I/F 107 is an interface to a network. Image data is received from a personal computer (PC) through the network I/F 107. Then, the image data is processed by the data processing apparatus 105. The processed image data can be printed by the recording apparatus 103. Also, image data is read from the original by the image-reading apparatus 101. Then, the read image data is processed by the data processing apparatus 105. Subsequently, the processed data can be sent to a PC through the network I/F 107.

In an ordinary copying process, obtained image reading signals are converted by the data processing apparatus 105 into recording signals. Then, the recording signals are sequentially output to the recording apparatus 103 to form an image on paper. The copying process according to the present exemplary embodiment is described below. Although a printing process and a transmitting process are not described in the following description of the present exemplary embodiment, the invention can be applied to the printing process and the transmitting process similarly to the copying process.

An instruction can be input from the input apparatus 106 to the color MFP. A sequence of these operations is controlled by the CPU 108 contained in the data processing apparatus 105.

Figure 2:
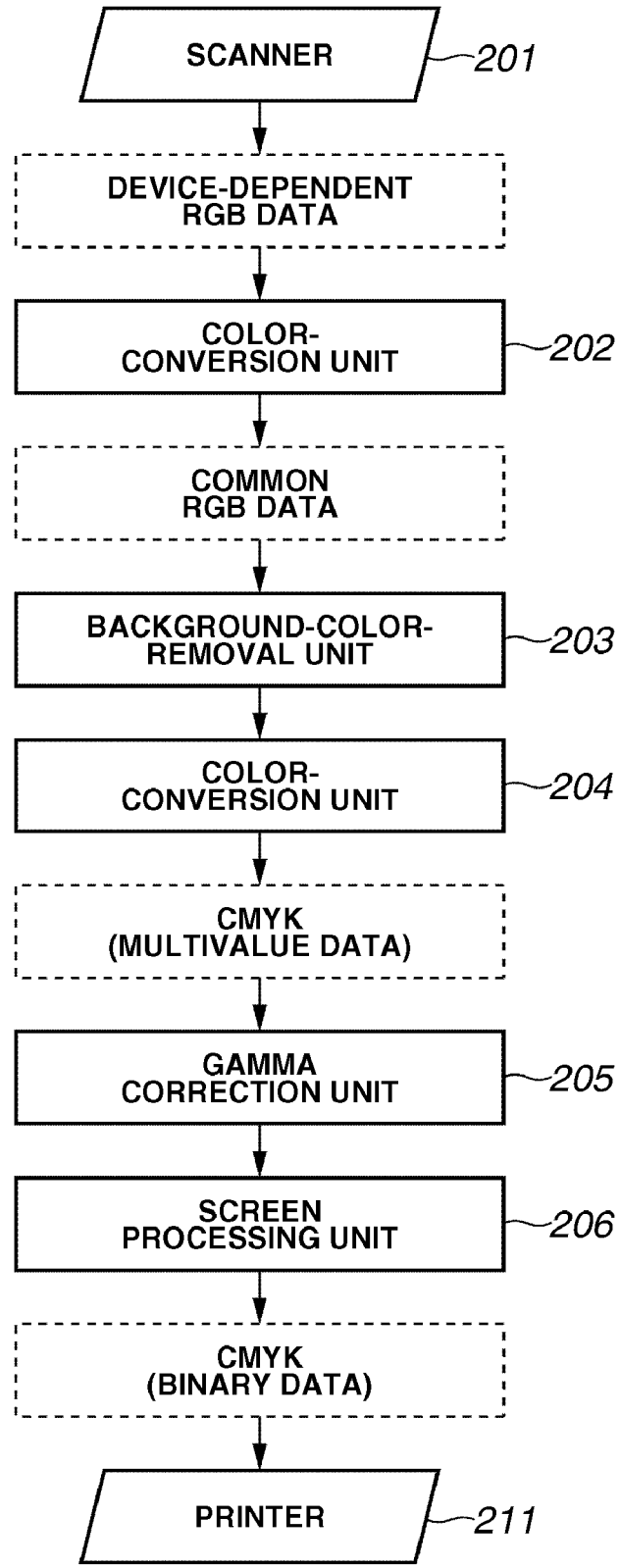
FIG. 2 is a block diagram illustrating a configuration of an image-processing apparatus of a conventional color multifunction peripheral.

Before describing the present exemplary embodiment, a conventional technique is described below. FIG. 2 is a block diagram illustrating an image-processing apparatus of a conventional color MFP. A color-conversion unit 202, a background-color-removal unit 203, a color-conversion unit 204, a gamma correction unit 205, and a screen processing unit 206 shown in FIG. 2 are contained in the data-processing apparatus 105, and are controller by the CPU 108. First, an original is scanned by a scanner 201, which corresponds to the image-reading apparatus 101 shown in FIG. 1, to read image data and obtain device-dependent RGB data. Subsequently, the color-conversion unit 202 performs color conversion of the device-dependent RGB data into common RGB data. The common RGB data is normalized RGB data that can be converted into device-independent color space data, such as L*a*b*. The color conversion by the color-conversion unit 202 can be performed using any unit, for example, a unit having a matrix computing function. Next, the background-color-removal unit 203 performs a background-color-removal process.

Figure 3:
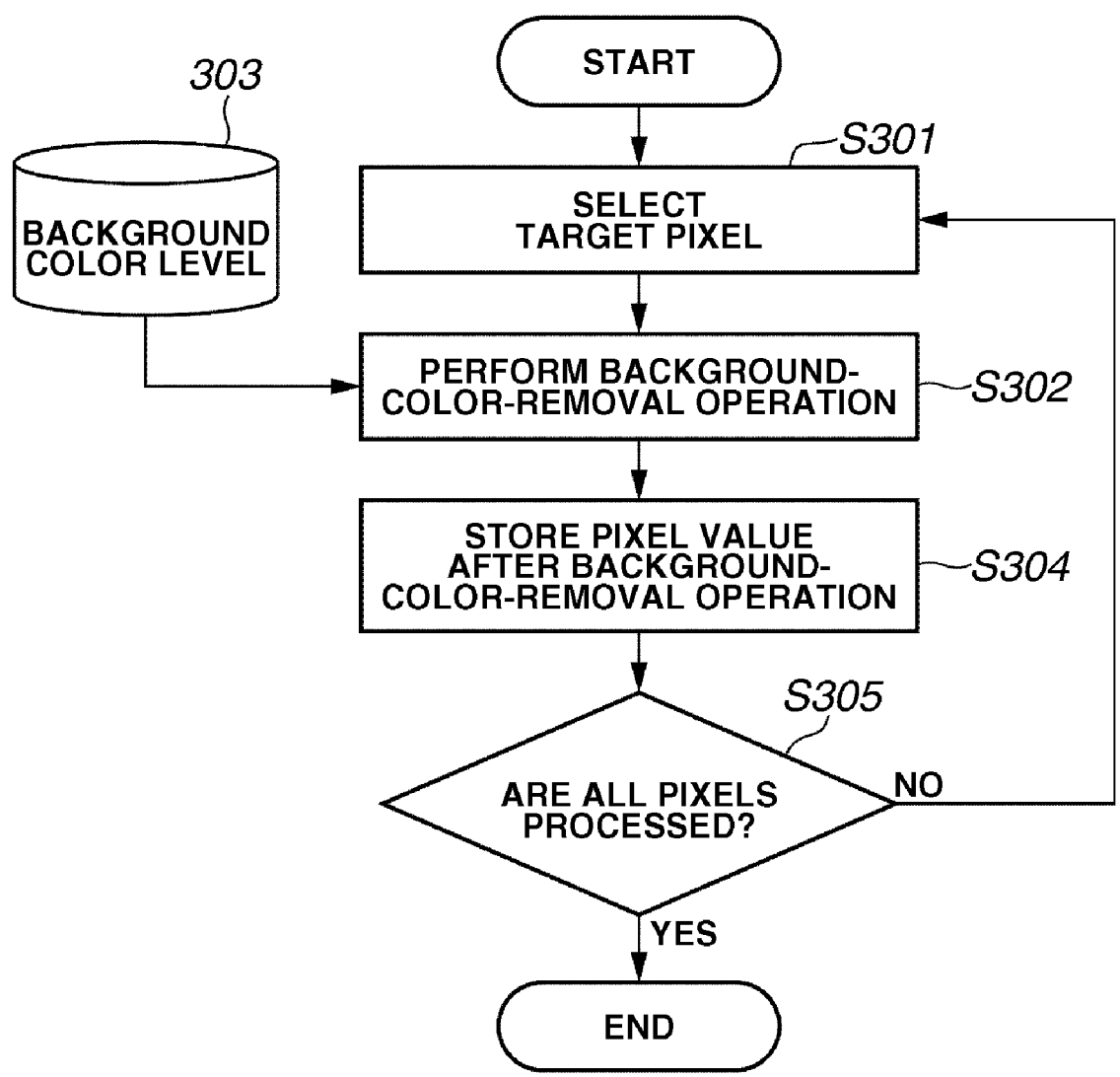
FIG. 3 is a flowchart illustrating a background-color-removal process according to an exemplary embodiment of the present invention.

FIG. 3 illustrates a flow of the background-color-removal process performed by the background-color-removal unit 203. First, in step S301, the background-color-removal unit 203 selects a target pixel from among pixels of an image represented by the read common RGB image data. Subsequently, in step S302, the background-color-removal unit 203 reads data representing a background color level 303 and performs the background-color-removal process on the target pixel. The background color level is a luminance level (or a density level) corresponding to a background of an image. Pixels having luminance levels being equal to or higher than the background color level are replaced with those whose luminance levels are equal to a white level or close to the white level.

Figure 18:
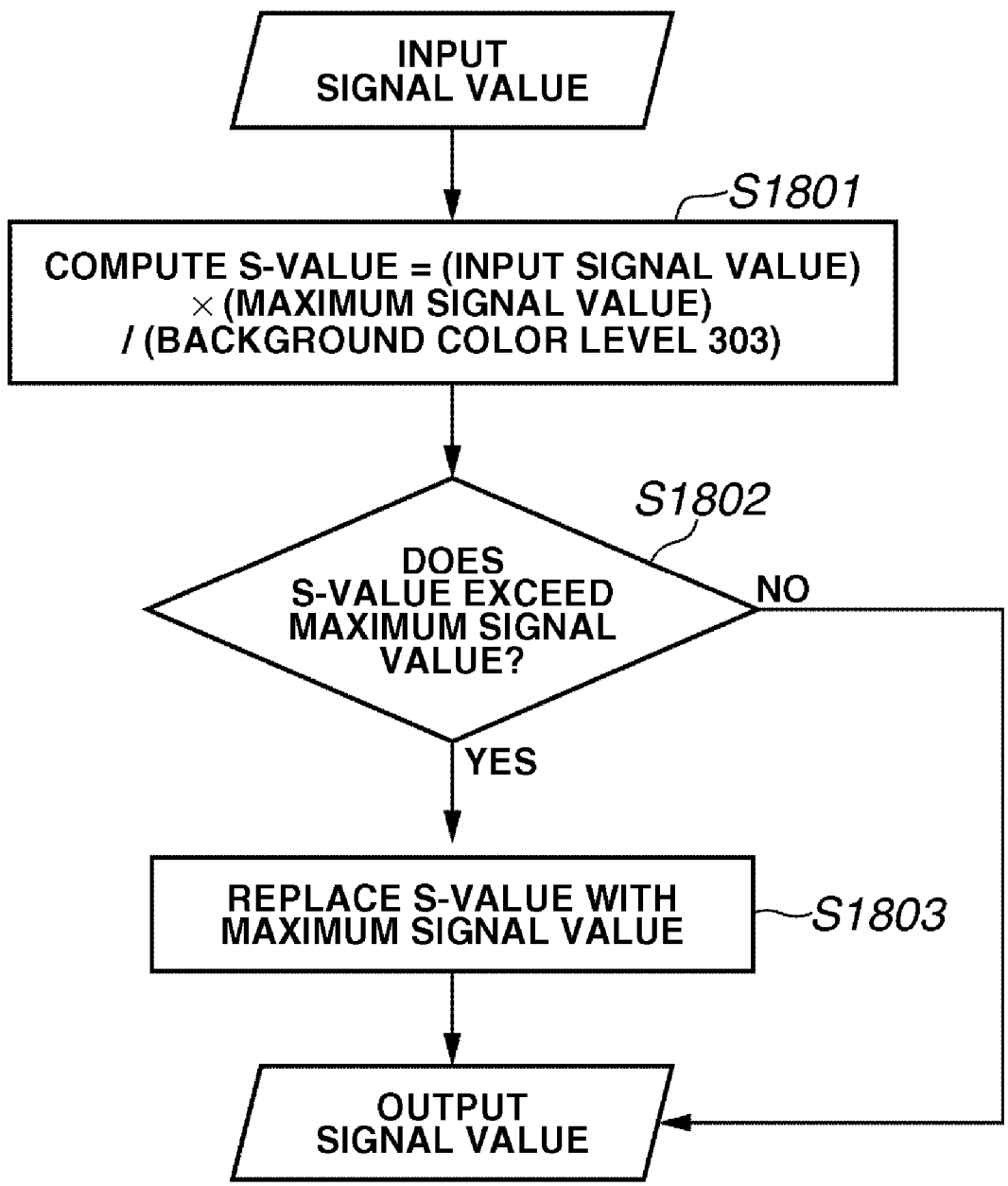
FIG. 18 illustrates an example of a background-color-removal operation.

FIG. 18 illustrates an example of a background-color-removal operation performed in step S302. In step S1801, the background-color-removal unit 203 executes the following operation expression (1) using the background color level 303.

$$S=(\text{an input signal value})\times(\text{a maximum signal value})/(\text{the background color level } 303) \quad (1)$$

Next, in step S1802, the background-color-removal unit 203 determines whether an S-value calculated by executing the operation expression (1) exceeds the maximum signal value. For example, in a case where each signal value is represented with 8 bits, the maximum signal value is "255". If the S-value exceeds the maximum signal value (YES in step S1802), then in step S1803, the background-color-removal unit 203 replaces the S-value with the maximum signal value and sets the maximum signal value as an output signal value. On the other hand, if the S-value does not exceed the maximum signal value (NO in step S1802), the background-color-removal unit 203 sets the S-value, which is computed in step S1801, as an output signal value. A method of performing a background-color-removal operation is not limited to the example illustrated in FIG. 18. For example, a nonlinear transformation process can be used to enhance precision.

Referring back to FIG. 3, processing performed in step S304 and subsequent steps is described below. After performing the background-color-removal operation in step S302, the process proceeds to step S304. In step S304, the background-color-removal unit 203 causes the RAM of the storage apparatus 102 or a memory (not shown) of the data processing apparatus 105 to store the output signal value of each pixel subjected to the background-color-removal operation. Then, in step S305, the background-color-removal unit 203 checks whether all of the pixels have been processed. If there is an unprocessed pixel (NO in step S305), the process returns to step S301. Then, the background-color-removal unit 203 selects an unprocessed pixel and repeats the above-described process. If all of the pixels have been processed (YES in step S305), the process ends.

Referring back to FIG. 2, processing performed by the color-conversion unit 204 and the subsequent processing are described below. After the background-color-removal process is performed by the background-color-removal unit 203 on each pixel of the image represented by the common RGB data, the color-conversion unit 204 performs color conversion. More specifically, the color-conversion unit 204 performs a process of converting the common RGB data to CMYK multivalue data that is device-dependent color space data for the printer 211. Then, the gamma correction unit 205 performs gamma correction on the CMYK data generated by the color-conversion unit 204. Subsequently, the screen-processing unit 206 performs screen processing to convert the gamma-corrected data to CMYK binary data that can be used for printing by the printer 211. Finally, the CMYK binary data is sent to the printer 211. Then, the copying process is finished.

Figure 4:
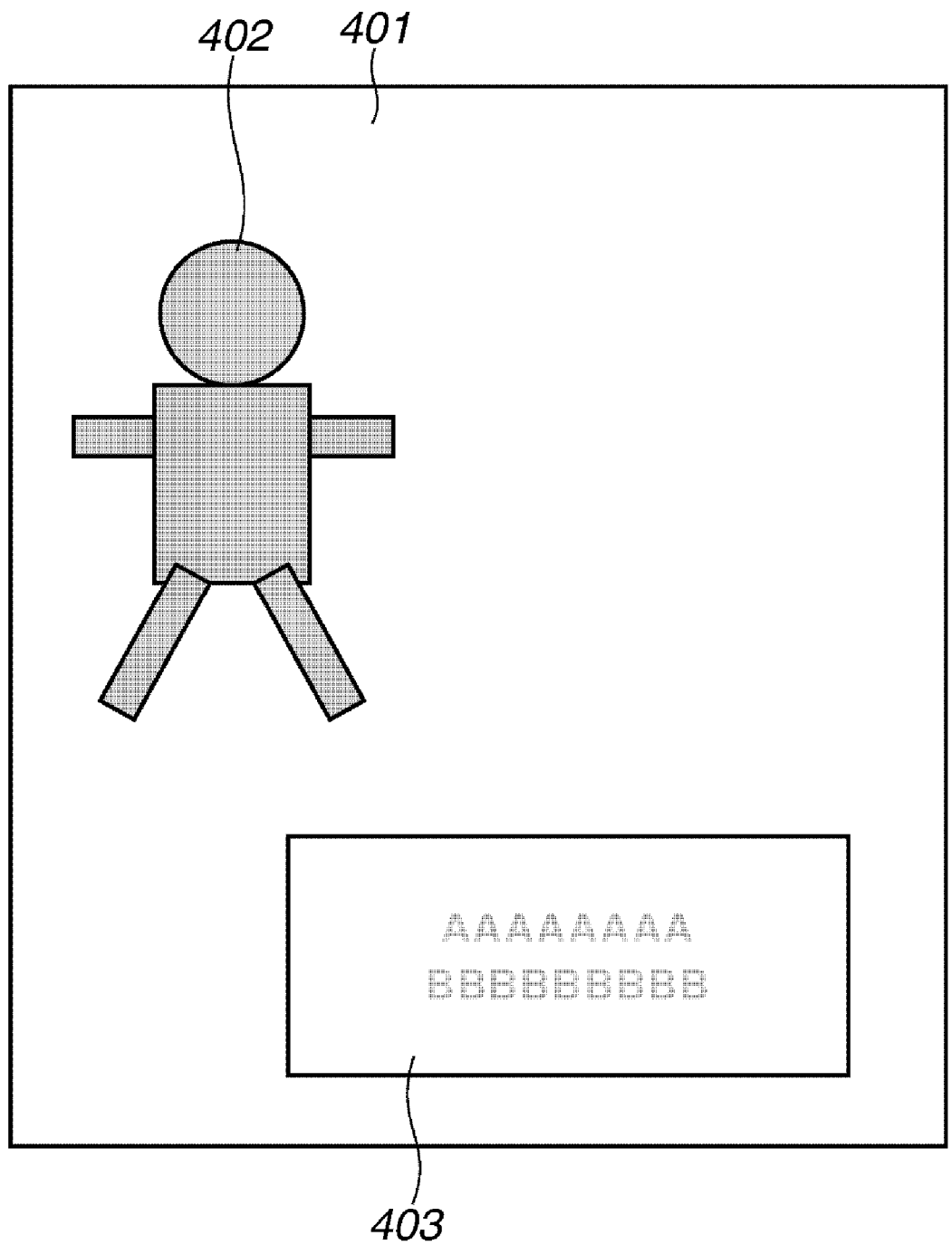
FIG. 4 illustrates an original before a copying operation is performed thereon.
Figure 5:
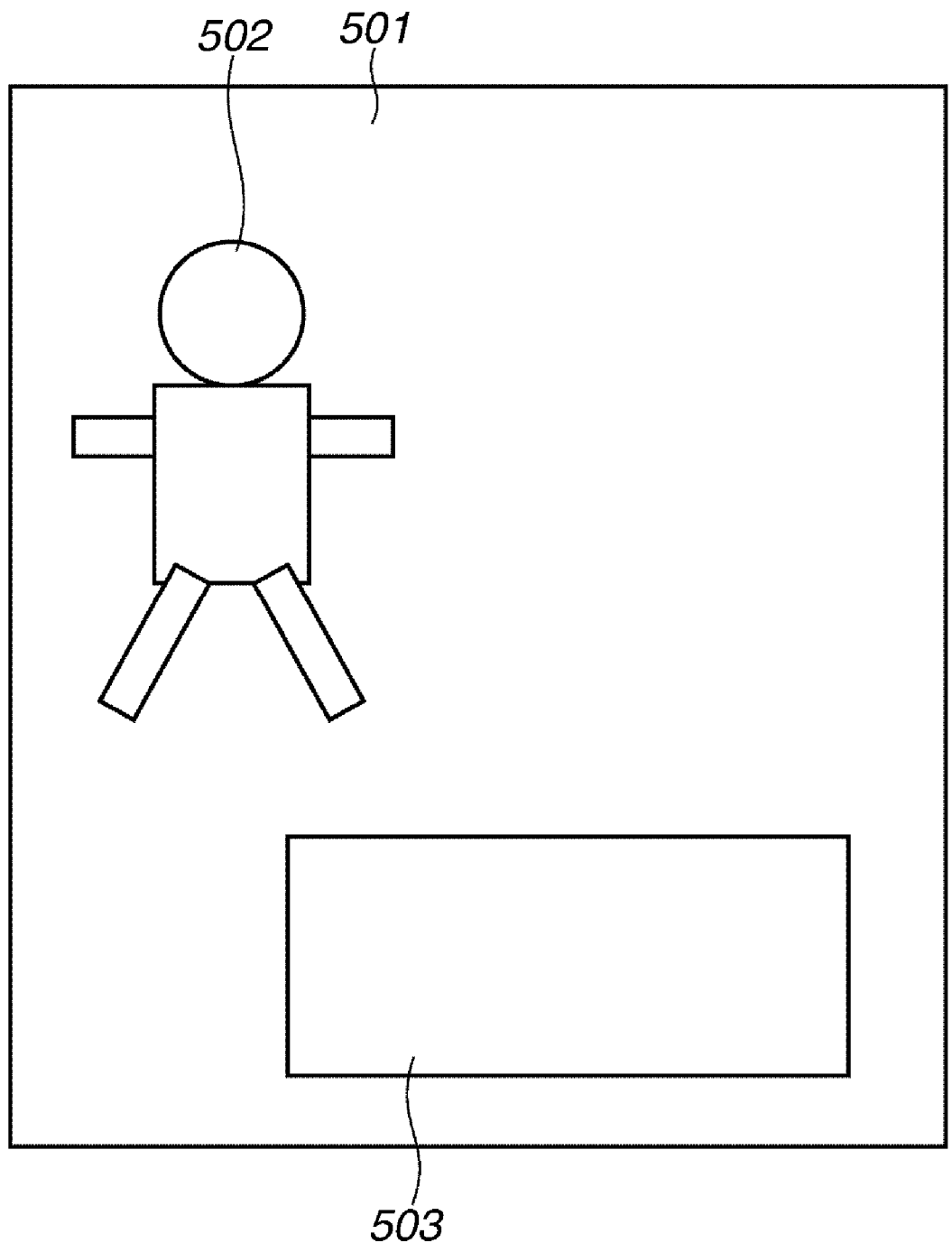
FIG. 5 illustrates a result of performing a copying operation on the original employing a conventional background-color-removal process.

Next, disadvantages of the background-color-removal process are described below. FIG. 4 illustrates an example of an original. A color of paper is reflected to the background 401 of the image of the original. For example, the background 401 is colored with light yellow. An object 402 is colored with light blue. Character data 403 represents an image having a white background on which light red characters are present. FIG. 5 illustrates a result of performing a copying operation including the background color removal illustrated in FIG. 2 on each of objects illustrated in FIG. 4. Color data representing the background 501 is replaced with white data by performing the background-color-removal process.

However, not only the data representing the background 501 but data representing a light color object 502 and light color characters 503 are removed. Especially, in a case where the printer 211 is configured by attaching importance to highlight reproducibility of highlight colors, such as light cyan and light magenta, highlight color data to be naturally reproduced is removed. Thus, the printer 211 cannot take advantage of characteristics thereof. This is a serious problem.

In an example illustrated in FIG. 5, the removed highlight color data corresponds to data representing the object 502 to be originally reproduced in light blue and data representing the characters 502 to be originally reproduced in light red.

The present exemplary embodiment assumes that a 6-color printer using light cyan and light magenta in addition to C, M, Y, and K is employed. The 6-color printer performs printing by giving importance to the highlight reproducibility of light cyan and light magenta to perform printing. Thus, when the conventional background-color-removal process is performed, light cyan and light magenta are converted into white. This results in reduction in image quality. The 6-color printer aims at enhancing tone reproduction by printing light cyan color data and light magenta color data. Thus, it is necessary to prevent light cyan and light magenta from being converted into white by the background-color-removal process.

Figure 6:
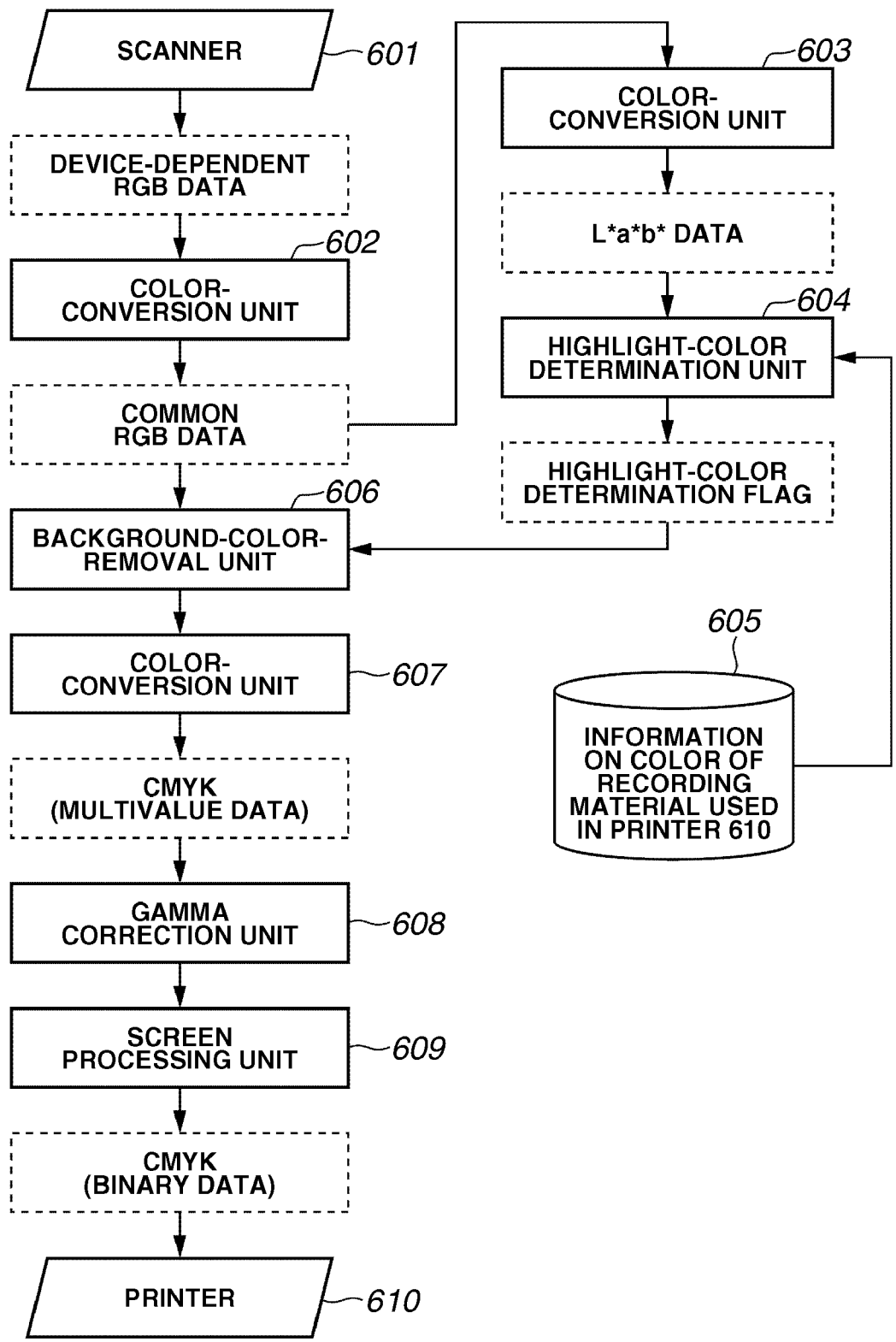
FIG. 6 illustrates a configuration of an image-processing apparatus of a color multifunction peripheral according to first and second exemplary embodiments of the present invention.

An exemplary embodiment of the present invention capable of solving the above-described problems is described below. FIG. 6 is a block diagram illustrating a configuration of an image-processing apparatus of a color MFP according to the present exemplary embodiment. First, data representing an original is scanned by a scanner 601, which corresponds to the image-reading apparatus 101 illustrated in FIG. 1, to read image data and obtain device-dependent RGB data. Subsequently, a color-conversion unit 602 performs color conversion of the device-dependent RGB data into common RGB data. A flow of this process up to this stage is similar to that of the conventional process illustrated in FIG. 2. Although the background-color-removal process is performed by the conventional color MFP after the common RGB data is obtained, the color conversion of the common RGB data into the L*a*b* data, representing luminance L* and hue and chromaticness a*b*, is performed by a color-conversion unit 603 of the present exemplary embodiment before the background-color-removal process is performed. Data, into which the common RGB data is converted, is not limited to the L*a*b* data. The data, into which the common RGB data is converted, may be any color space data, as long as the color space data can represent the luminance and the hue and chromaticness.

Next, a highlight-color determination unit 604 performs highlight-color determination using information 605 concerning a color of a recording material, such as toner and ink, used in a printer 610. Then, the highlight-color determination unit 604 adds a highlight flag to a pixel whose color is determined to be highlight color. The information 605 concerning a color of a recording material used in the printer 610 represents highlight color that can be printed by the printer 610. In a case where color materials of light cyan and light magenta can be output by the printer 610, highlight cyan and highlight magenta are highlight colors. The highlight colors are colors, such as light cyan and light magenta, in a color gamut, which can be reproduced using light color toner. A pixel value at a pixel, whose color is generated by light color toner and dark color toner used so that the rate of light color toner is larger than the rate of dark color toner, or whose color is generated only by light color toner, is set to be a highlight value. A pixel value at a pixel, whose color is generated by light color toner and dark color toner used so that the rate of dark color toner is larger than the rate of light color toner, or whose color is generated only by dark color toner, is low in luminance and is inappropriate to be employed as a highlight value.

In a case where the printer 610 can output color materials of red, green, and blue, highlight red, highlight green, and highlight blue are highlight colors. Highlight colors are not limited to colors generated using color materials that can be output by the printer 610. Any color can be set as a highlight color. Although the a*b* value is employed as the information 605 concerning a color of a recording material according to the present exemplary embodiment, any information representing color can be used as the information 605.

Next, a process performed in the highlight-color determination unit 604 is described in detail with reference to FIG. 7. First, in step S701, the L*a*b* value of a target pixel is input to the highlight-color determination unit 604. Next, in step S702, the highlight-color determination unit 604 determines whether the L* value is equal or higher than a predetermined value. The L*a*b* system is a color system of CIE1976 L*a*b* uniform color space. The L* value represents luminance. The larger the L* value represented by data, the higher the luminance represented by the data. According to the present exemplary embodiment, highlight data is extracted, so that data having a low L* value is excluded. Thus, in a case where the L* value is not higher than a predetermined value (NO in step S702), the highlight-color determination unit 604 proceeds to step S709. In step S709, the highlight-color determination unit 604 determines whether all of the pixels of the image have been processed. If all of the pixels are not completely processed (NO in step S709), the process returns to step S701. Then, the highlight-color determination unit 604 repeatedly performs the above-described process on the other unprocessed pixels. If all of the pixels have been processed (YES in step S709), the highlight-color determination unit 604 ends the process.

If the L* value is equal to or higher than the predetermined value (YES in step S702), the process advances to step S703. In step S703, the highlight-color determination unit 604 compares the a*b* value of the target pixel with the information (or highlight information) 605 concerning a color of a recording material that can be printed by the printer 610. The present exemplary embodiment employs the a*b* value representing hue and chromaticness as the highlight information. Color information on another color space can also be employed as the highlight information.

Figure 8:
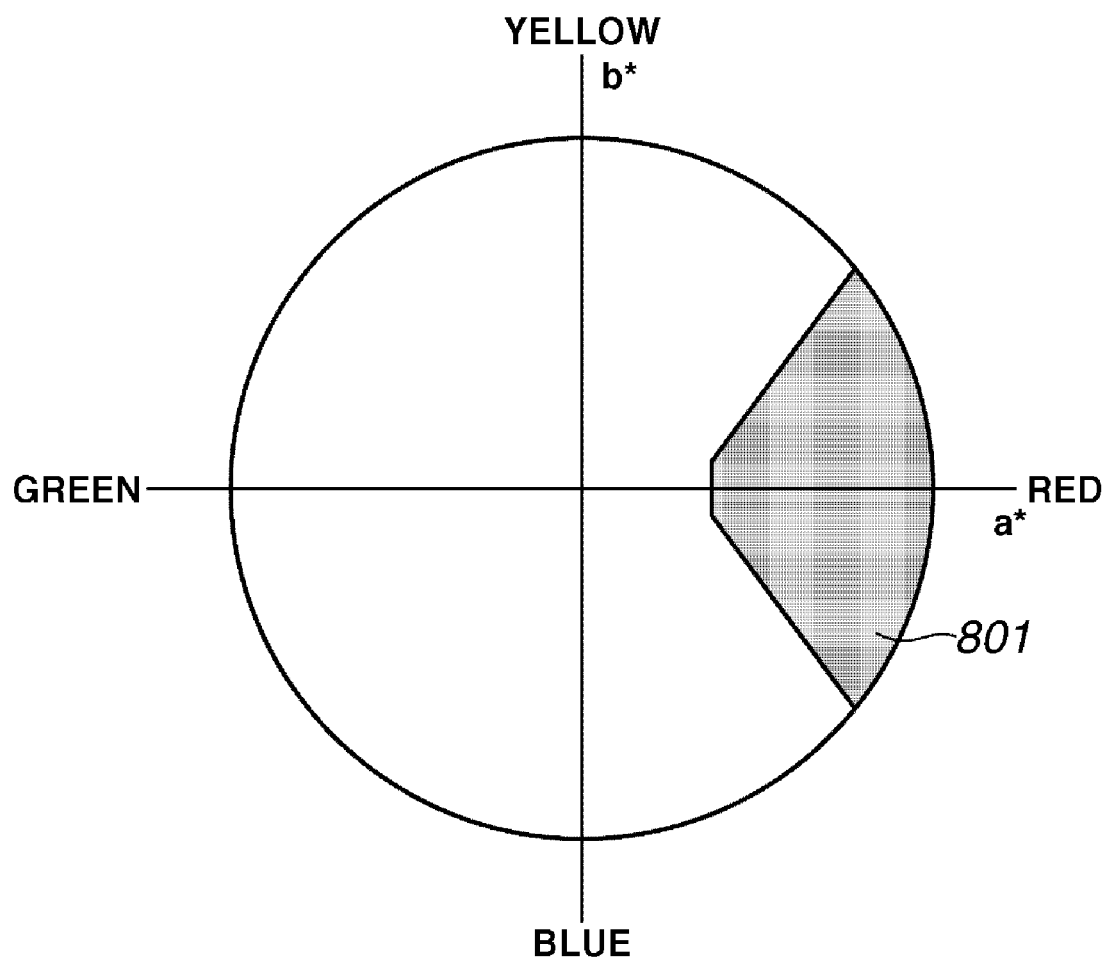
FIG. 8 illustrates a range of highlight magenta.
Figure 9:
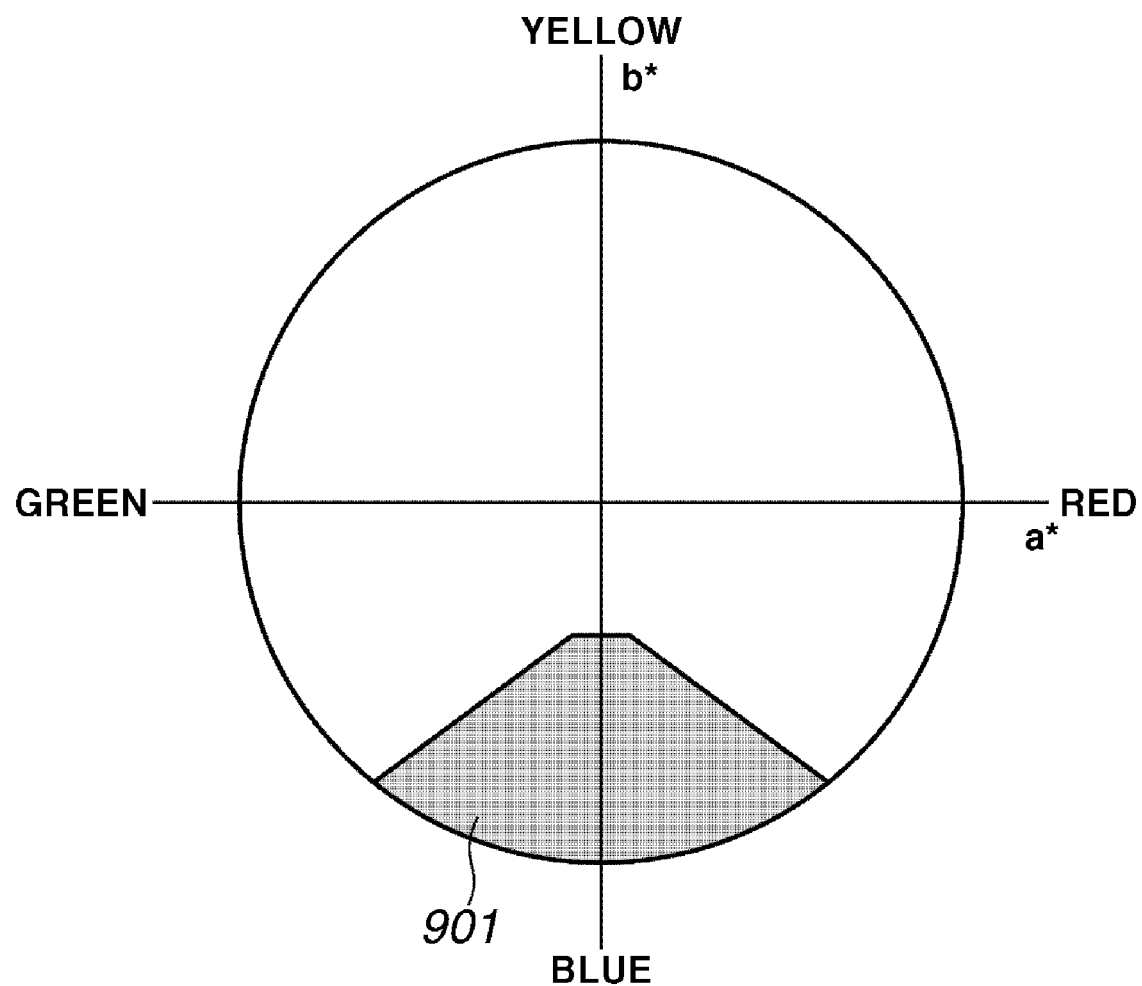
FIG. 9 illustrates a range of highlight cyan.

In a case where the a*b* value represented by pixel data is within a range 801 of highlight magenta, which is illustrated in FIG. 8, it is determined that a color of a pixel represented by the pixel data is highlight magenta. Similarly, in a case where the a*b* value represented by pixel data is within a range 901 of highlight cyan, which is illustrated in FIG. 9, it is determined that a color of a pixel represented by the pixel data is highlight cyan. As described above, highlight magenta and highlight cyan are generated using both light color toner and dark color toner used so that the rate of light color toner is larger than the rate of dark color toner, or using only light color toner.

The present exemplary embodiment describes a case where there are a plurality of kinds of highlight information. The number of kinds of highlight information may be one. Data obtained by integrating a plurality of kinds of highlight information can also be employed as the highlight information.

In step S705, the highlight-color determination unit 604 determines whether the a*b* value of the target pixel is within a predetermined range represented by the highlight information. If the a*b* value of the target pixel is within the predetermined range (YES in step S705), the process proceeds to step S706. If the a*b* value of the target pixel is not within the predetermined range (NO in step S705), the process proceeds to step S708. In step S706, the highlight-color determination unit 604 determines that the target pixel is a highlight portion. Then, in step S707, the highlight-color determination unit 604 adds a highlight-color determination flag to the target pixel. Different flags are used as the highlight-color determination flag according to the kind of highlight color represented by the highlight information.

Next, in step S708, the highlight-color determination unit 604 determines whether all of pieces of highlight information have been checked. If there is unchecked highlight information (NO in step S708), the process returns to step S703. Then, the highlight-color determination unit 604 repeatedly performs the above-described process by extracting another highlight information. If all of the pieces of highlight information have been checked (YES in step S708), the process advances to step S709. In step S709, the highlight-color determination unit 604 determines whether all of the pixels have been processed. If all of the pixels are not completely processed (NO in step S709), the process returns to step S701. Then, the highlight-color determination unit 604 repeatedly performs the above-described process on the other unprocessed pixels. If all of the pixels have been processed (YES in step S709), the highlight-color determination unit 604 ends the process.

The present exemplary embodiment assumes that data representing the highlight-color determination flag to be added in step S707 is changed according to the kind of highlight information. However, the same highlight-color determination flag may be added.

After a highlight-color determination process is thus performed by the highlight-color determination unit 604, the background-color-removal unit 606 performs the background-color-removal process according to the present exemplary embodiment, using the highlight-color determination flag and the common RGB data.

Next, the process performed by the background-color-removal unit 606 is described below with reference to FIG. 10. First, in step S1001, the background-color-removal unit 606 selects a target pixel. Next, in a step S1002, the background-color-removal unit 606 checks whether a highlight-color determination flag 1003 is added to the target pixel. The highlight-color determination flag 1003 is similar to the flag to be added in step S707 illustrated in FIG. 7.

Next, in step S1004, the background-color-removal unit 606 determines whether data representing the target pixel is highlight data. If the highlight-color determination flag 1003 is added to the target pixel, it is determined that the data representing the target pixel is highlight data (YES in step S1004). Then, in step S1005, the background-color-removal unit 606 performs a background-color-removal operation using a background color level A. The method illustrated in FIG. 18 is used in the background-color-removal operation. The method used for the background-color-removal operation is not limited to the method illustrated in FIG. 18. Any method can be employed as the method used for the background-color-removal operation. The background color level A is a parameter corresponding to highlight data. Thus, the background color level A is set at a luminance level that is equal or close to a white level. If it is determined in step S1004 that the data representing the target pixel is not highlight data (NO in step S1004), then in step S1007, the background-color-removal unit 606 performs a background-color-removal operation on the target pixel using a background color level B. The background color level B is a background color level which is similar to that used in an ordinary background-color-removal process and which is lower in luminance than the background color level A.

Then, in step S1009, the background-color-removal unit 606 causes the RAM of the storage apparatus 102 or a memory (not shown) of the data processing apparatus 105 to store an output signal value of each pixel subjected to the background-color-removal operation. Subsequently, in step S1010, the background-color-removal unit 606 determines whether all of the pixels of the image have been processed. If all of the pixels have not yet been processed (NO in step S1010), the process returns to step S1001. Then, the background-color-removal unit 606 selects another unprocessed pixel and repeats the above-described process. If all of the pixels have been processed (YES in step S1010), the background-color-removal unit 606 ends the process.

If it is determined in step S1004 that the data representing the target pixel is highlight data, the common RGB data generated by the color-conversion unit 602 can be stored directly in the memory, without performing the background-color-removal operation in step S1005.

After the background-color-removal process is performed by the background-color-removal unit 606 illustrated in FIG. 6, the color-conversion unit 607 performs color conversion and calculates CMYK multivalue data similarly to the ordinary copying operation. Then, the gamma correction unit 608 performs a gamma correction process on the CMYK multivalue data. Also, the screen-processing unit 609 performs screen processing on the CMYK multivalue data to obtain CMYK binary data. Finally, the CMYK binary data is output to the printer 610.

Figure 11:
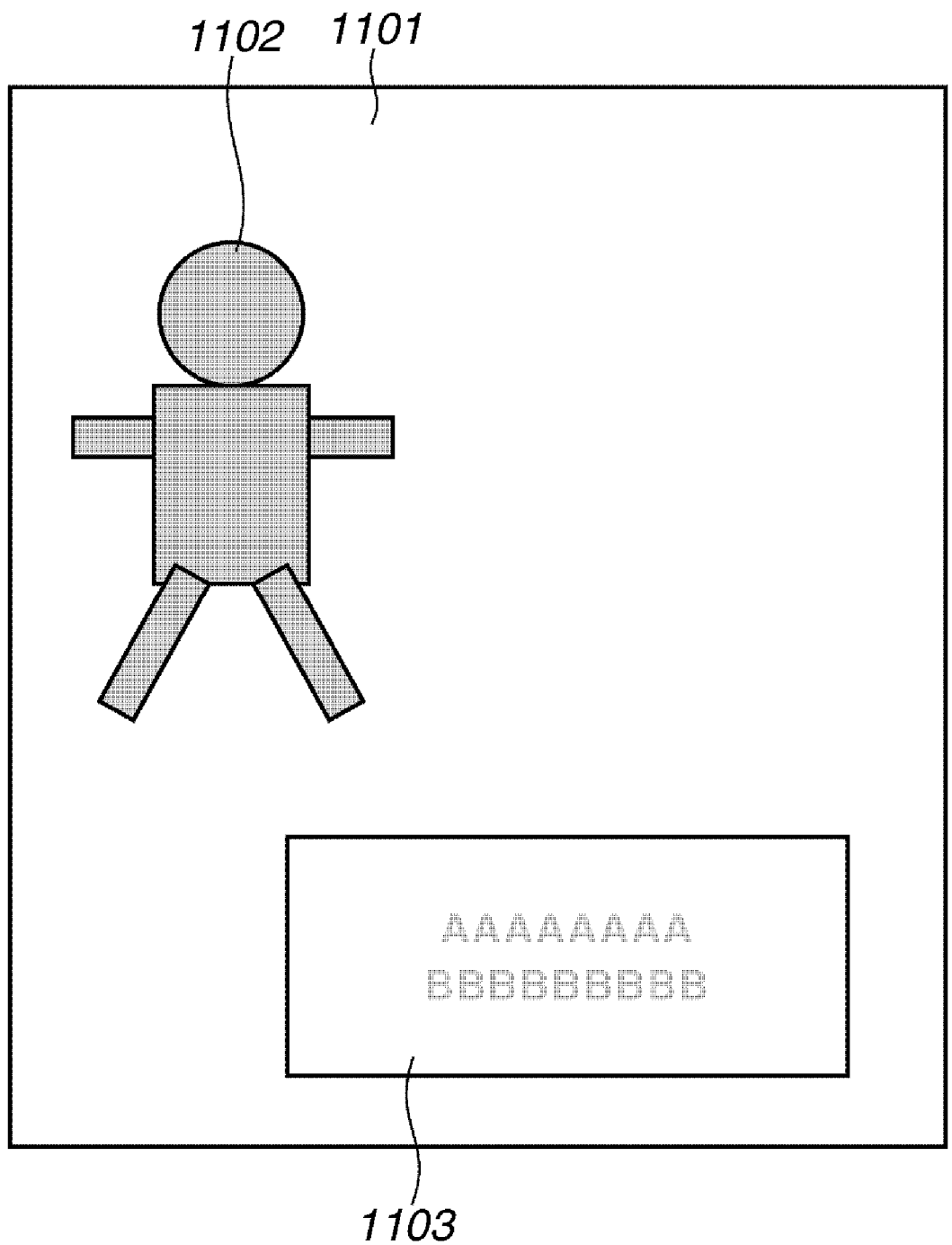
FIG. 11 illustrates a result of performing a copying operation on the original employing a background-color-removal process according to the first exemplary embodiment of the present invention.

FIG. 11 illustrates a result of the background-color-removal process according to the present exemplary embodiment. FIG. 11 illustrates an example of performing the background-color-removal process on data representing the image of the original illustrated in FIG. 4. As illustrated in FIG. 4, the image of the original includes a background 401 represented by light yellow data, an object 402 represented by light blue data, and characters 403 represented by light red data. When the background-color-removal process according to the present exemplary embodiment is performed, the color of the object 402 is determined as highlight cyan. The color of the characters 403 is determined as highlight magenta. The background-color-removal operation in step S1005 is performed on the object 402, and the characters 403 according to the background color level A. In contrast, data representing the background 401 is not determined as highlight-color data. Thus, the background-color-removal operation in step S1007 is performed on the background 401 according to the background color level B. Consequently, the background color is removed similarly to the conventional MFP. Accordingly, as illustrated in FIG. 11, a result of performing the background-color-removal process is such that data representing the background 1101 is white data and that the data representing the object 1102 and the characters 1103 is left without being removed.

Although the copying process has been described in the present exemplary embodiment by way of example, the present exemplary embodiment can be applied to any kind of image processing, as long as the image processing is adapted so that a highlight-color determination is performed on a received input image, and that a background color is removed using a result of the highlight-color determination. More specifically, the present exemplary embodiment can be applied to printing processing performed on input image data received from a printer driver and to transmission processing typically performed by a facsimile (FAX).

As described above, according to the first exemplary embodiment, the reproducibility of highlight data at the time of performing the background-color-removal process can be enhanced by setting the background color level for the highlight data to be close to a white level. Also, the reproducibility of desired highlight data can be enhanced by defining a range of highlight data according to information on color materials that can be used for printing by a printing apparatus. Thus, the background color removal is performed on the background similarly to the conventional MFP. Consequently, the background-color-removal process highly achieving both highlight reproduction and background color removal can be implemented as compared with the conventional technique.

Second Exemplary Embodiment

The first exemplary embodiment performs the background color removal using one background color level when data representing a target pixel is determined as highlight data. On the other hand, a second exemplary embodiment of the present invention performs background color removal according to kinds of highlight data by setting different background color levels for different highlight data.

A flow of the entire process according to the second exemplary embodiment is similar to that in the first exemplary embodiment illustrated in FIG. 6. Also, a flow of a highlight-color determination process according to the second exemplary embodiment is similar to that in the first exemplary embodiment illustrated in FIG. 7.

Figure 12:
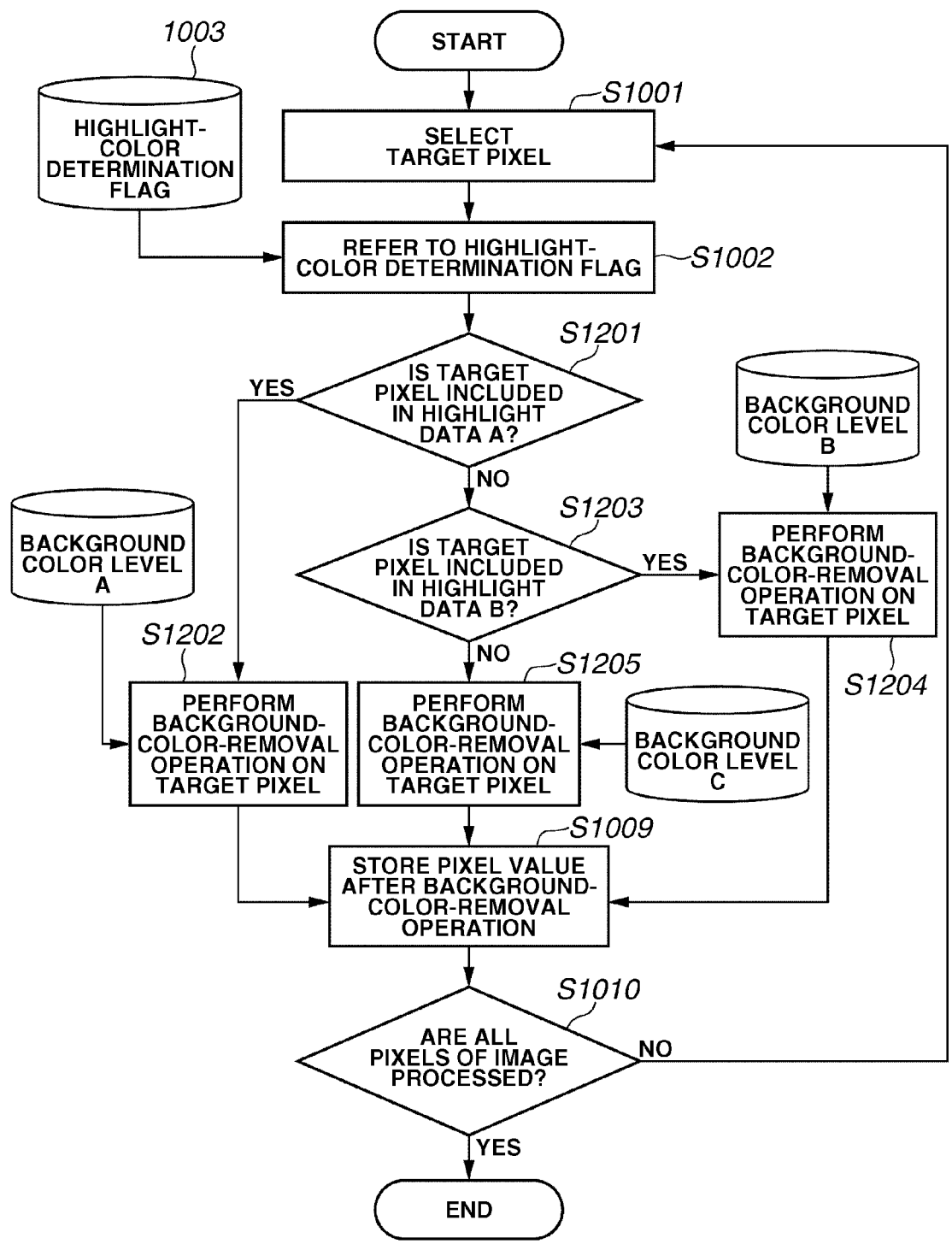
FIG. 12 is a flowchart illustrating a background-color-removal process performed in a copying operation in the second exemplary embodiment of the present invention.

FIG. 12 illustrates a background-color-removal process performed by the background-color-removal unit 606 according to the second exemplary embodiment. It is assumed that there are two kinds of highlight information. Steps S1001, S1002, S1009, and S1010 illustrated in FIG. 12 are similar to those of the first exemplary embodiment illustrated in FIG. 10. The second exemplary embodiment differs from the first exemplary embodiment in steps S1201 to S1205. The second exemplary embodiment performs steps S1201 to S1205 instead of steps 1004, S1005, and S1007 of the first exemplary embodiment.

Figure 7:
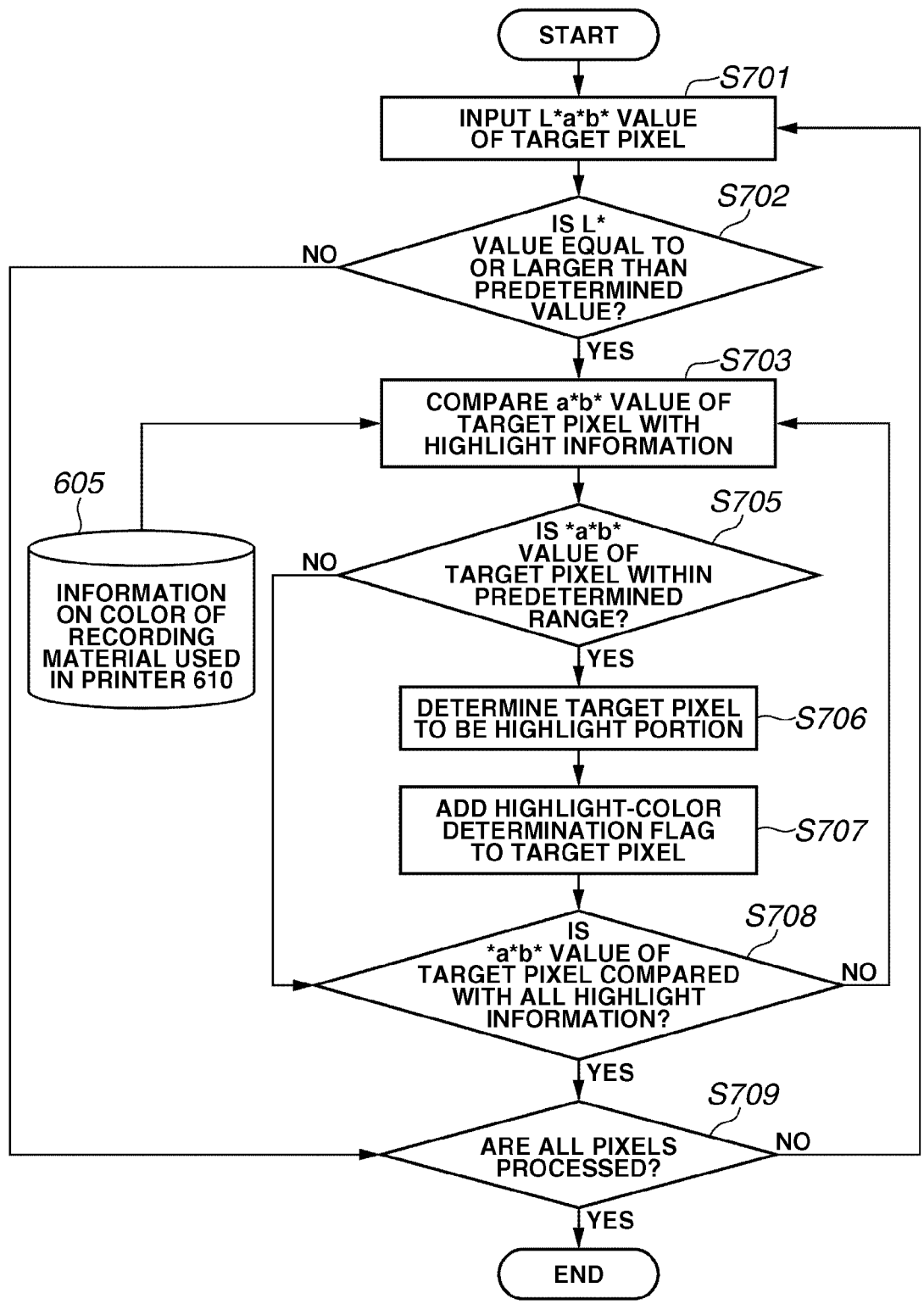
FIG. 7 illustrates a process performed at a highlight-color determination unit in detail.

Also, the highlight-color determination unit 604 adds different highlight-color determination flags, such as highlight-color determination flags A and B, respectively to pixels represented by highlight data in step S707 shown in FIG. 7.

Hereinafter, a process performed in steps S1201 to S1205 is described. In step S1201, the background-color-removal unit 606 determines whether data representing a target pixel is highlight data A. In a case where the highlight-color-determination flag A is added to the target pixel, it is determined that the data representing the target pixel is the highlight data A (YES in step S1201). Then, in step S1202, the background-color-removal unit 606 performs a background-color-removal operation using a background color level A. If it is determined that the data representing the target pixel is not the highlight data A (NO in step S1201), then in step S1203, the background-color-removal unit 606 determines whether data representing the target pixel is the highlight data B, to which the highlight-color-determination flag B is added. If it is determined that the data representing the target pixel is the highlight data B (YES in step S1203), then in step S1204, the background-color-removal unit 606 performs a background-color-removal operation using a background color level B. If it is determined that the data representing the target pixel is not the highlight data B (NO in step S1203), then in step S1205, the background-color-removal unit 606 performs a background-color-removal operation using a background color level C. The background color level C is similar to that used when performing the ordinary background-color-removal process. The background color level A and the background color level B are background color levels optimal for corresponding highlight colors.

Thus, a higher precision background-color-removal process is enabled by setting different background color levels corresponding to highlight data. The second exemplary embodiment can be configured so that no background-color-removal operation is performed corresponding to the highlight data similarly to the first exemplary embodiment. That is, if it is determined that data representing a target pixel is the highlight data A, the background-color-removal operation in step S1202 can be skipped. Also, if it is determined that data representing a target pixel is the highlight data B, the background-color-removal operation in step S1204 can be skipped.

In the foregoing description of the second exemplary embodiment, a case in which there are two kinds of highlight-color determination flags has been described. However, the image-processing apparatus can use two or more kinds of highlight-color determination flags. In this case, the precision of the background color removal can be enhanced by adding a determination process of determining whether data representing a target pixel is highlight data C as a process subsequent to the determination process of determining whether data representing a target pixel is the highlight data B. The second exemplary embodiment can be applied to any kind of image processing, as long as the image processing is adapted so that a highlight color determination is performed on a received input image, and that a background is removed using a result of the highlight color determination similarly to the first exemplary embodiment. More specifically, the present exemplary embodiment can be applied to printing processing performed on input image data received from a printer driver and to transmission processing typically performed by a facsimile (FAX).

As described above, according to the second exemplary embodiment, different background color levels are set corresponding to pieces of highlight information. Also, background-color-removal processes respectively using the set background color levels according to the pieces of highlight information are performed. Thus, a color optimal for each of the pieces of highlight information can be output. Also, in a case where the optimal background color level for the highlight data A differs from the optimal background color level for the highlight data B, optimal parameters respectively corresponding to different highlight data can be set rather than setting a uniform background color level for pixels respectively corresponding to the different highlight data. Consequently, as compared with the first exemplary embodiment, a higher precision background-color-removal process can be implemented according to the second exemplary embodiment.

Third Exemplary Embodiment

A third exemplary embodiment of the present invention employing a technique of a region separation utilized in a conventional copying machine, in addition to the techniques of highlight-color determination employed in the first and second exemplary embodiments, is described below.

Figure 13:
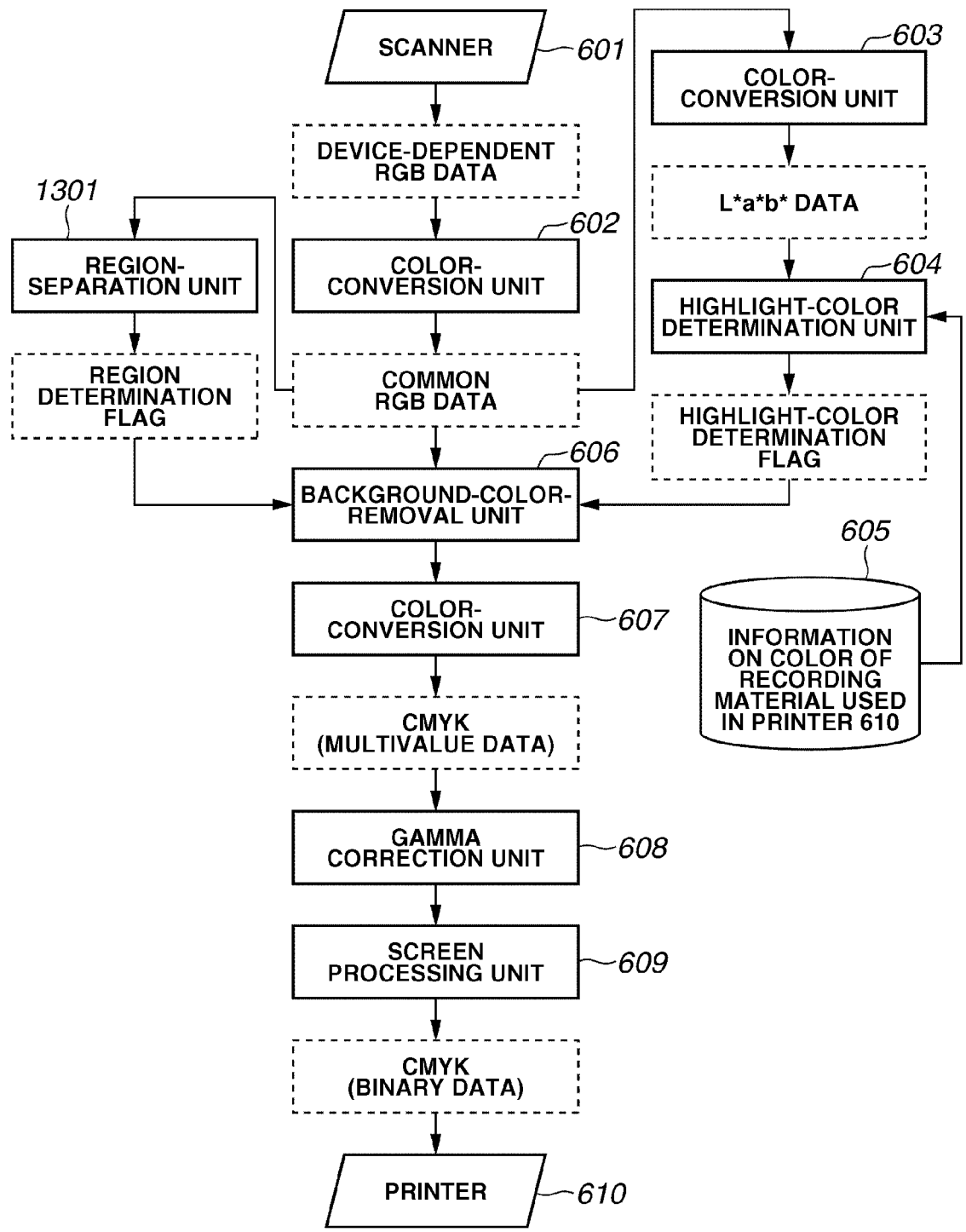
FIG. 13 illustrates a configuration of an image-processing apparatus of a color multifunction peripheral according to a third exemplary embodiment of the present invention.

FIG. 13 illustrates a configuration of an image-processing apparatus of a color MFP according to the third exemplary embodiment of the present invention.

A flow of the entire process according to the third exemplary embodiment is similar to that in the first exemplary embodiment illustrated in FIG. 6. Also, a flow of a highlight color-determination process according to the third exemplary embodiment is similar to that in the first exemplary embodiment illustrated in FIG. 7. However, according to the third exemplary embodiment, in the background-color-removal process, a region determination flag is used in addition to the highlight-color determination flag. In addition to determination of the highlight-color determination flag, a region-separation unit 1301 performs a region-separation process to calculate a region determination flag.

Hereinafter, a concept and an example of the image separation process are described. In the following description, only an example of a method of extracting a region attribute is described. The region-separation method according to the third exemplary embodiment is not limited thereto.

The region-separation process is adapted to extract features of an image and to generate a signal indicating the region attribute (flag data) so as to perform optimal image processing according to the features of the image. An image of an original includes various regions, for example, a continuous tone full-color photograph area, a solid-black character area, a halftone-dot printing area typically included in a page space of a newspaper. In a case where the same image processing is uniformly performed on the areas having different features, it is usual that favorable image quality is not obtained as a result of the image processing.

Thus, attributes of image data included in the image of the original are detected using color image signals representing common RGB data. Also, flag data for discrimination of the image data is generated.

Figure 14:
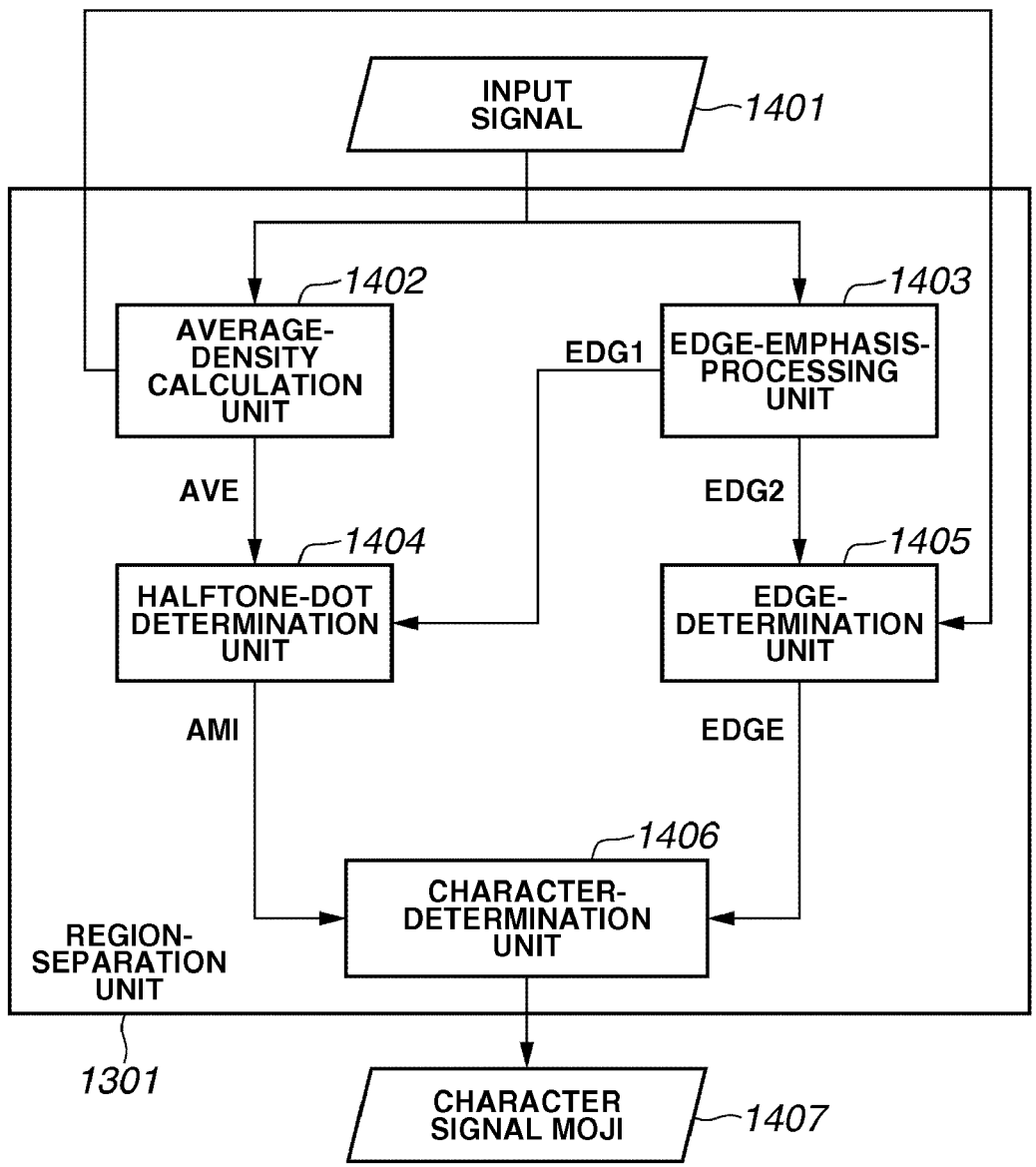
FIG. 14 is a block diagram illustrating a configuration of a region separation unit according to the third exemplary embodiment of the present invention.

FIG. 14 is a block diagram illustrating a configuration of the region-separation unit 1301 configured to detect a pixel having a character attribute according to the third exemplary embodiment of the present invention.

An input (color image) signal 1401 is input to an average-density calculation unit 1402 and an edge-emphasis-processing unit 1403. The average-density calculation unit 1402 outputs an average value, AVE, of density in an area including M×N pixels (M, N being natural numbers) arranged around a target pixel in the input signal 1401. On the other hand, the edge-emphasis-processing unit 1403 performs an edge emphasis process on a target pixel referring to data of a peripheral area (e.g., an area including M×N pixels) of the target pixel, and outputs two kinds of edge emphasis signals EDG1 and EDG2 differing in magnitude from each other. The signals AVE and EDG1 are input to a halftone-dot determination unit 1404. The signals AVE and EDG2 are input to an edge-determination unit 1405.

Figure 16:
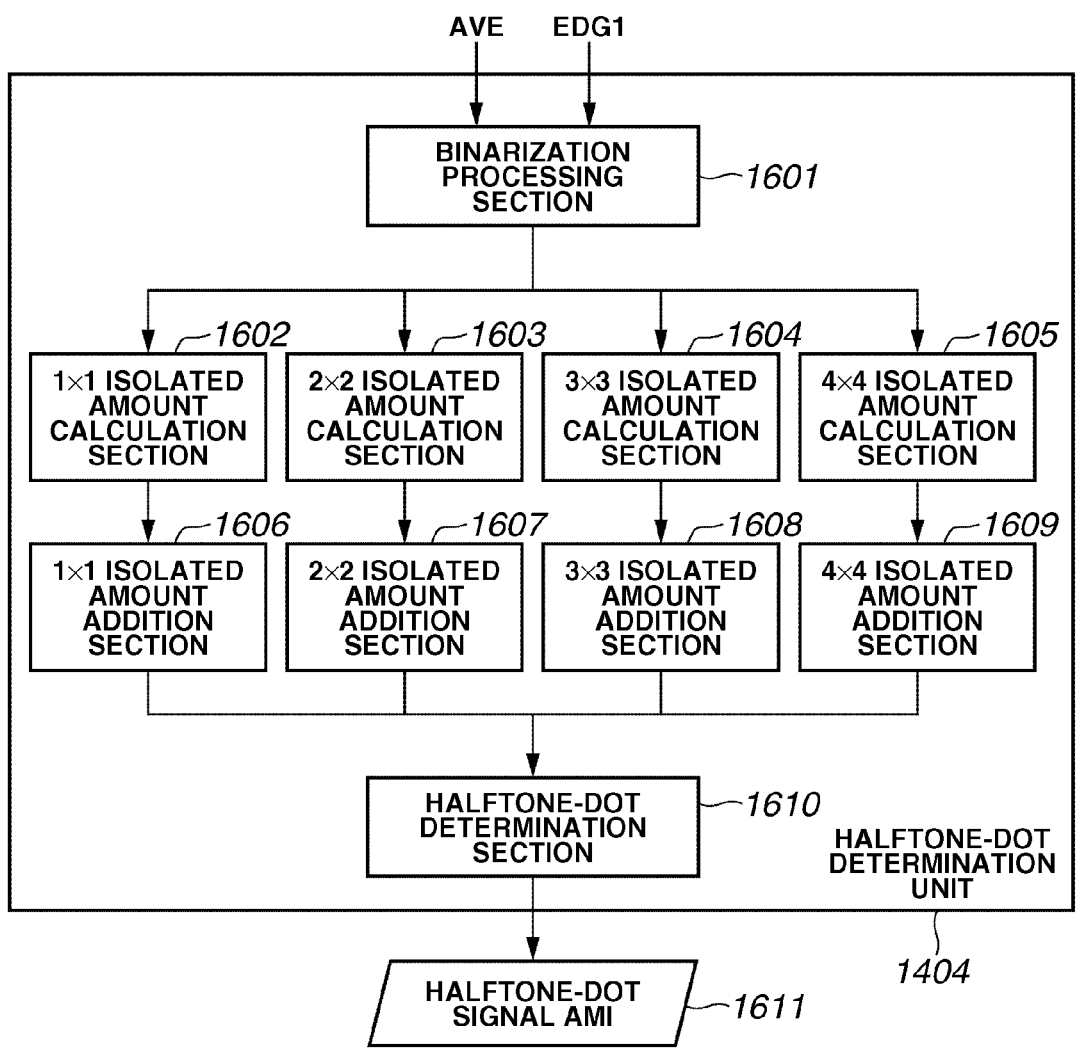
FIG. 16 is a block diagram illustrating a configuration of a halftone-dot determination unit, to which an average value and an edge enhancement signal are input, in the third exemplary embodiment of the present invention.

FIG. 16 is a block diagram illustrating a configuration of the halftone-dot determination unit 1404, to which the average signal AVE and the edge emphasis signal EDG1 are input. A binarization processing section 1601 generates a binarization signal according to a result of comparing the average value AVE with a value obtained by multiplying the edge emphasis signal EDG1 by a factor A that is a real number, as indicated by the following expressions (2).

If $A \times EDG1 < AVE$, a value represented by the binarization signal="1",

If $A \times EDG1 \geq AVE$, a value represented by the binarization signal="0" (2)

Binarization signals respectively obtained corresponding to pixels by the binarization processing section 1601 are input to a 1×1 isolated amount calculation section 1602, a 2×2 isolated amount calculation section 1603, a 3×3 isolated amount calculation section 1604, and a 4×4 isolated amount calculation section 1605. According to a result of the binarization processing, the isolated amount calculation sections 1602 to 1605 determine an extent to which the target pixel is isolated.

For example, calculation of an isolated amount is performed by the 1×1 isolated amount calculation section 1602 as follows. First, the 1×1 isolated amount calculation section 1602 refers to values represented by binarization signals respectively corresponding to the pixels of a 3×3 pixel area centered at the target pixel. In a case where the values arranged in a longitudinal direction, a transverse direction, or a diagonal direction are changed like "0", "1", and "0", the isolated amount corresponding to the direction is set to be "1". A sum of the isolated amounts respectively corresponding to four directions, that is, the single longitudinal direction, the single transverse direction, and the two diagonal directions is output as an isolated amount of the target pixel. Therefore, in a case where the degree of isolation of a pixel is high, the isolated amount of such pixel is "4". In a case where a pixel is not isolated, the isolated amount of such pixel is "0". Incidentally, the isolated amount of a pixel has such features that in a case where a halftone dot is constituted by one pixel, the isolated amount of the pixel is relatively large in comparison with that of a dot pixel of a low-density area or of a halftone-dot area including a large number of lines.

Similarly, each of the 2×2 isolated amount calculation section 1603, the 3×3 isolated amount calculation section 1604, and the 4×4 isolated amount calculation section 1605 outputs the isolated amount of the target pixel by comparison with a predetermined binarization pixel pattern. Each of a 1×1 isolated amount addition section 1606, a 2×2 isolated amount addition section 1607, a 3×3 isolated amount addition section 1608, and a 4×4 isolated amount addition section 1609 adds up the isolated amounts calculated in an associated one of the 1×1 isolated amount calculation section 1602, the 2×2 isolated amount calculation section 1603, the 3×3 isolated amount calculation section 1604, and the 4×4 isolated amount calculation section 1605 in a predetermined area. For example, the 1×1 isolated amount addition section 1606 adds up the isolated amounts in a 9×9 pixel area.

A halftone-dot determination section 1610 performs threshold processing on addition values respectively calculated by the 1×1 isolated amount addition section 1606, the 2×2 isolated amount addition section 1607, the 3×3 isolated amount addition section 1608, and the 4×4 isolated amount addition section 1609. The halftone-dot determination section 1610 outputs a halftone-dot signal (AMI) 1611 by performing a majority operation or a logic operation on results of the threshold processing. In a case where the halftone-dot determination section 1610 determines that the target pixel constitutes a halftone dot, the halftone-dot determination section 1610 outputs a halftone-dot signal AMI representing a value "1" (AMI="1").

Figure 15:
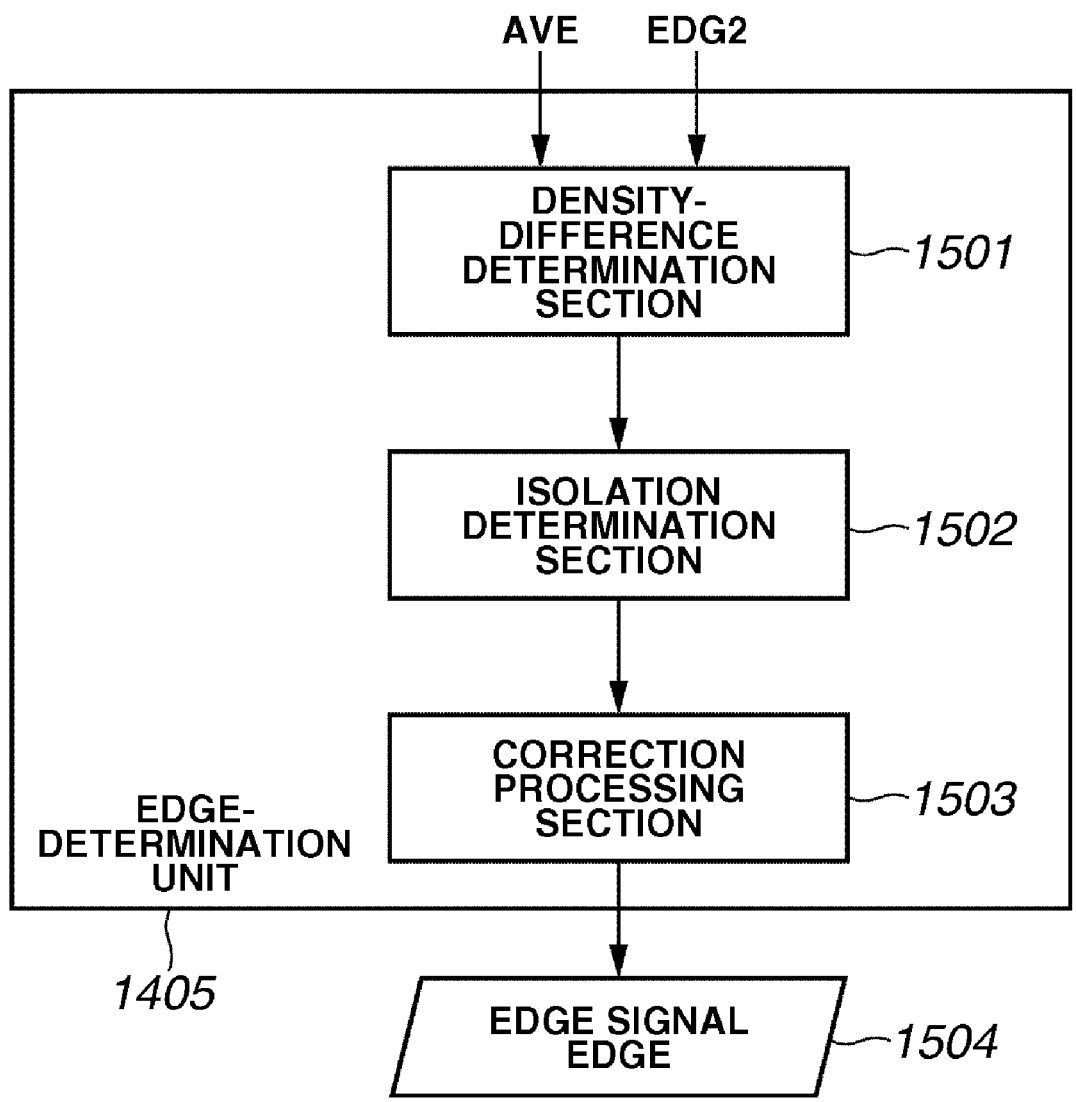
FIG. 15 is a block diagram illustrating a configuration of an edge determination unit, to which an average value and an edge enhancement signal are input, in the third exemplary embodiment of the present invention.

FIG. 15 is a block diagram illustrating a configuration of the edge-determination unit 1405, to which the average value signal AVE and the edge emphasis signal EDG2 are input.

A density-difference determination section 1501 generates a density-difference signal based on a result obtained by multiplying the edge emphasis signal EDG2 by a factor B (a real number) and comparing the multiplied result with the factor B, as indicated by the following expressions (3).

If $C < AVE - B \times EDG2 < D$, a value represented by the density-difference signal is "1", Otherwise, a value represented by the density-difference signal is "0"                                                                   (3), where C and D are real or integer numbers.

That is, the density-difference determination section 1501 outputs a density-difference signal representing a value corresponding to a difference between the value of the edge emphasis signal EDG2 and the average value AVE of the peripheral area of the target pixel.

An isolation determination section 1502 receives the density-difference signal and eliminates an isolated point. For example, the isolation determination section 1502 refers to values represented by the density-difference signals in a 7×7 pixel area. In a case where there is no density-difference signal representing a value of "1" corresponding to an outermost pixel position, the isolation determination section 1502 forcibly sets values of the density-difference signals respectively corresponding to pixels of an inner 5×5 pixel area of the 7×7 pixel area to be "0". Consequently, the isolation determination section 1502 eliminates an isolated point. A density-difference signal, which is output by the isolation determination unit 1502 after the isolated point is eliminated, is referred to as an isolation determination signal.

A correction processing section 1503 receives the isolation determination signal and outputs an edge signal (EDGE) 1504 obtained by correcting a discontinuous portion of the isolation determination signal. For example, the correction processing section 1503 refers to values of the isolation determination signals corresponding to pixels of a 3×3 pixel area. In a case where a value of the isolation determination signal corresponding to one of pixels, which are arranged in a longitudinal direction, a lateral direction, or a diagonal direction and are intervened by a target pixel placed at the center of the area, is "1", and where a value of the isolation determination signal corresponding to the target pixel is "0", the correction processing section 1503 corrects the value of the isolation determination signal to be "1". A lost part, from which an associated isolation determination signal is lost, in an edge area of a line drawing or a character is restored by this processing. Thus, the correction processing section 1503 generates an edge signal EDGE representing a smooth edge area of the line drawing or the character, in which continuity is increased. The correction processing section 1503 generates an edge signal EDGE which corresponds to an edge area and represents a value of "1".

Next, a character-determination unit 1406 receives the halftone-dot signal AMI output from the halftone-dot determination unit 1404 and the edge signal EDGE output from the edge-determination unit 1405. Then, the character-determination unit 1406 outputs a character signal (MOJI) 1407 representing a pixel that corresponds to the values AMI="0" and EDGE="1". Data representing pixels, each of which corresponds to the values AMI="0" and EDGE="0", that is, data representing pixels having no associated signals AMI and EDGE, is background color data. A background-color-removal process is performed utilizing the halftone-dot signal AMI and the character signal MOJI.

Figure 17:
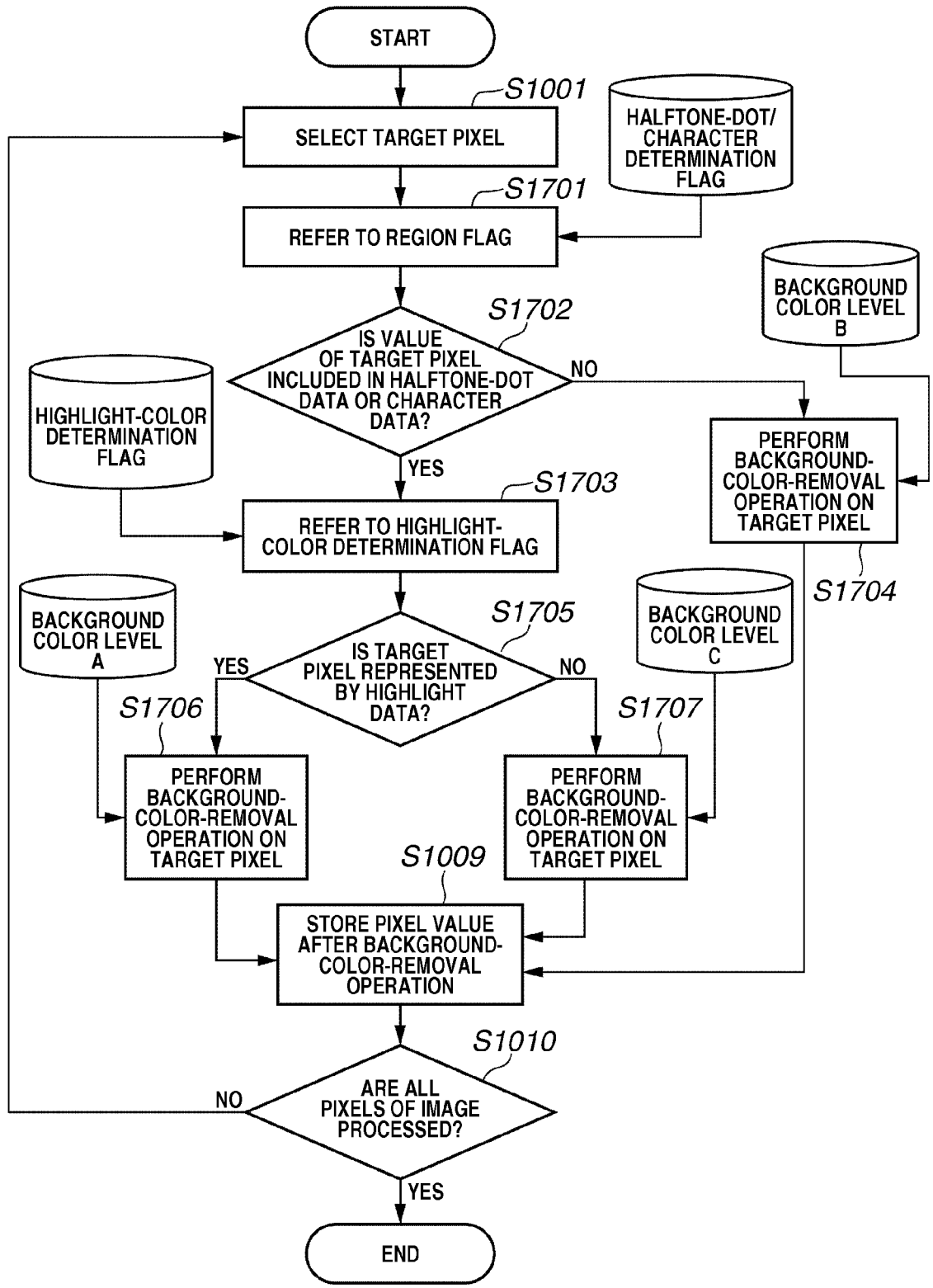
FIG. 17 is a flowchart illustrating a background-color-removal process performed in a copying operation in the third exemplary embodiment of the present invention.

FIG. 17 illustrates a process performed by the background-color-removal unit 606 according to the third exemplary embodiment.

Figure 10:
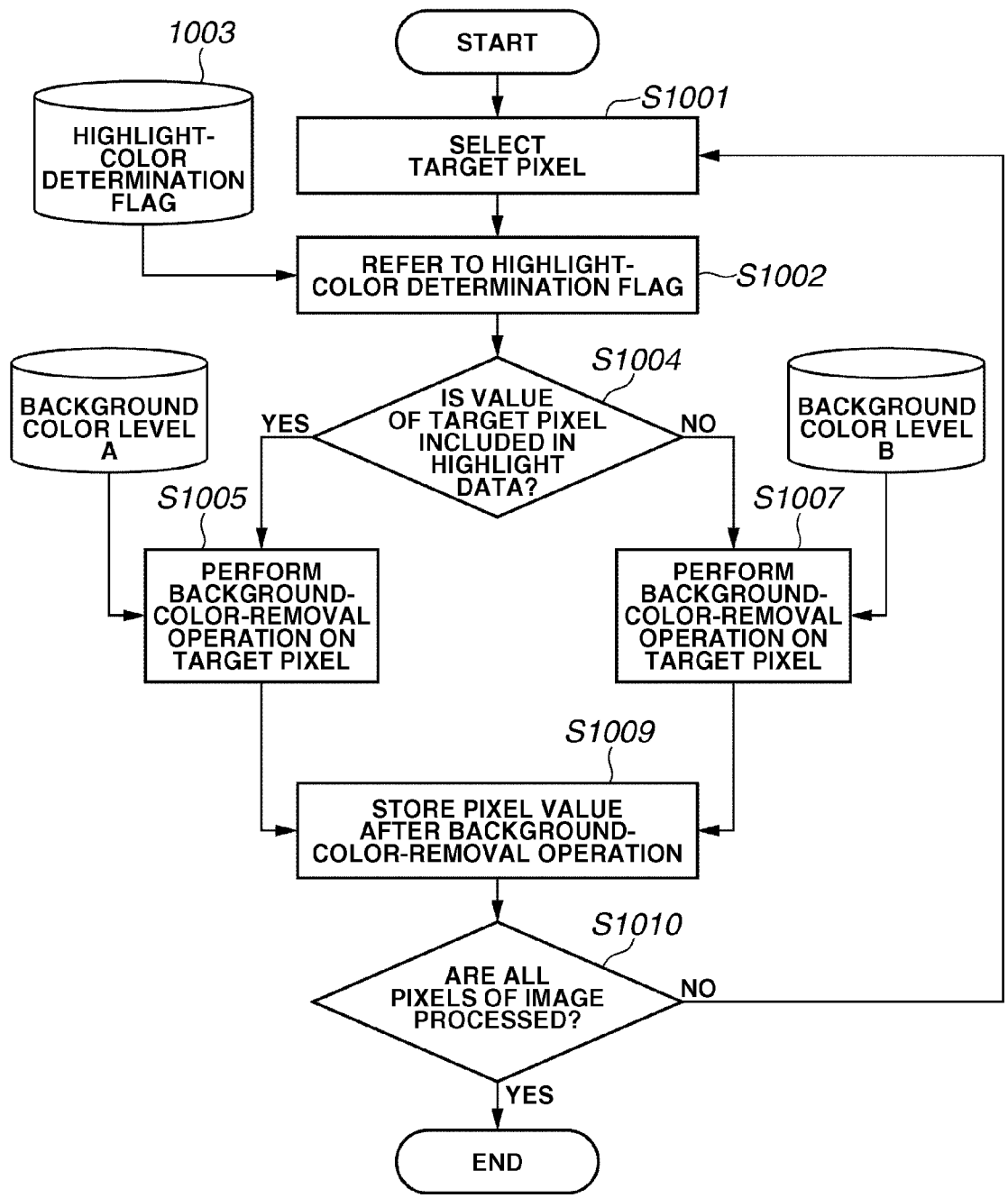
FIG. 10 is a flowchart illustrating a background-color-removal process performed in a copying operation in the first exemplary embodiment of the present invention.

Steps S1001, S1009, and S1010 illustrated in FIG. 17 are similar to steps S1001, S1009, and S1010 illustrated in FIG. 10, respectively. The process illustrated in FIG. 17 differs from that of the first exemplary embodiment in steps S1701 to S1707. Hereinafter, the process including steps S1701 to S1707 is described.

First, in step S1701, the background-color-removal unit 606 refers to the region flag using a halftone-dot/character determination flag calculated by the region-separation unit 1301. Then, in step S1702, the background-color-removal unit 606 determines whether data representing the target pixel is halftone-dot data or character data.

If the data representing the target pixel is neither halftone-dot data nor character data (NO in step S1702), the background-color-removal unit 606 proceeds to step S1704. In step S1704, the background-color-removal unit 606 performs a background-color-removal operation on the target pixel using a background color level B. The background color level B is similar to that used in the first exemplary embodiment and is a background color level used in the ordinary background-color-removal process performed on the background color.

If the data representing the target pixel is halftone-dot data or character data (YES in step S1702), the background-color-removal unit 606 proceeds to step S1703. In step S1703, the background-color-removal unit 606 refers to the highlight-color determination flag corresponding to the target pixel. The highlight-color determination flag is similar to that generated by the highlight-color determination unit 604 illustrated in FIG. 13.

Next, in step S1705, the background-color-removal unit 606 determines whether data representing the target pixel is highlight data. In a case where the highlight-color determination flag is added to the data representing the target pixel, the background-color-removal unit 606 determines that the data representing the target pixel is highlight data (YES in step S1705). Then, in step S1706, the background-color-removal unit 606 performs a background-color-removal operation on the target pixel using a background color level A. The background color level A is similar to that used in the first exemplary embodiment. The background color level A is the highlight background color level and is set to be equal to or close to a white level. Consequently, a background-color-removal amount is small.

If the background-color-removal unit 606 determines that the data representing the target pixel is not highlight data (NO in step S1705), then in step S1707, the background-color-removal unit 606 performs a background-color-removal operation on the target pixel using a background color level C. The background color level C is higher than the background color level B and is lower than background color level A. That is, when the background-color-removal process is performed using the background color level C, the background-color-removal amount is large as compared with a case where the background color level A is used. Also, the background-color-removal amount is small as compared with a case where the background color level B is used.

Although halftone-dot/character flag is treated as a unit in the present exemplary embodiment, halftone dots can be treated separately from characters. Thus, the background-color-removal operation can be performed using different background color levels respectively corresponding to the halftone-dot and the character. The flags used to perform the background-color-removal operation are not limited to the halftone-dot flag and the character flag. Any additional flag can be added, as long as the additional flag represents attribute information. According to the present exemplary embodiment, the process is split according to the presence/absence of the highlight-color determination flag similarly to the first exemplary embodiment. However, the processes can be separately performed according to the highlight-color determination flag similarly to the second exemplary embodiment. The third exemplary embodiment can be applied to any image processing, as long as the image processing is adapted so that the highlight-color determination is performed on a received input image, and the background-color-removal process is performed according to a result of the highlight-color determination similarly to the first exemplary embodiment. More specifically, the present exemplary embodiment can be applied to printing processing performed on input image data received from a printer driver and to transmission processing typically performed by a facsimile (FAX).

As described above, according to the third exemplary embodiment, the background color removal can be performed by setting the background color level using a result of the region separation and that of the highlight color determination. Thus, the background-color-removal process can be performed on, for example, a portion determined as a halftone dot or a character using a background color level determined according to the highlight information. A background-color-removal process similar to the conventional process is performed on a background portion which is determined to be neither a halftone dot nor a character. Thus, the possibility of causing the background color to stand out sharply can be reduced. Consequently, according to the third exemplary embodiment, a higher precision background-color-removal process can be achieved as compared with the first exemplary embodiment.

Other Exemplary Embodiments

The present invention can be applied to either a system including a plurality of devices (e.g., a host computer, an interface unit, a reader, and a printer) or an apparatus (e.g., a copying machine, and a facsimile apparatus) constituted by a single device.

The present invention can be achieved by providing a storage medium, on which software implementing the functions of the above-described exemplary embodiments is recorded, to a system or an apparatus and by causing a computer (e.g., a central processing unit (CPU) or a micro processing unit (MPU)) to execute the software. In this case, the software itself read from the storage medium implements the functions of the above-described exemplary embodiments. The storage medium storing the software embodies the present invention.

The functions of the above-described exemplary embodiments are implemented not only when the software is executed by a computer but also when an operating system (OS) or the like running on the computer performs part or all of actual processing according to instructions issued by the software.

Program code read out from a storage medium can be written in the memory of a function expansion card inserted into the computer or a function expansion unit connected to the computer. The CPU of the function expansion card or unit can perform part or all of actual processing according to instructions issued by the software to thereby implement the functions of the above-described exemplary embodiments.

In a case where the present invention is applied to a storage medium, software corresponding to the flowcharts described in the foregoing description of the exemplary embodiments of the present invention is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-174135 filed Jun. 23, 2006, which is hereby incorporated by reference herein in its entirety.

What is claimed is:

1. An image-processing apparatus configured to perform a background-color-removal process on color image data, the image-processing apparatus comprising:

a determination unit configured to determine whether a pixel value of the color image data is highlight information to be reproduced using a light color material; and a processing unit configured to perform a background-color-removal process, using a highlight background color level, on a pixel having a pixel value determined by the determination unit to be the highlight information, and to perform a background-color-removal process, using a background color level that is lower in luminance than the highlight background color level, on a pixel having a pixel value determined not to be the highlight information.

2. The image-processing apparatus according to claim 1, further comprising an adding unit configured to add a highlight attribute to pixels having a pixel value determined by the determination unit to be the highlight information, wherein the processing unit performs a background-color-removal process, using the highlight background color level, on the pixel to which the highlight attribute is added.

3. The image-processing apparatus according to claim 1, further comprising a color conversion unit configured to convert the color image data to L*a*b* data, wherein when the determination unit is configured so that it is determined that a pixel corresponding to the L*a*b* data has an L*-value being equal to or greater than a predetermined value and has an a*b*-value being within a predetermined range, the determination unit determines that the pixel value is highlight information.

4. The image-processing apparatus according to claim 1, wherein the highlight background color level is a white level or is close to the white level.

5. The image-processing apparatus according to claim 1, wherein the highlight information includes first highlight data and second highlight data,
   wherein if it is determined by the determination unit that the pixel value is the first highlight data, the processing unit is configured to perform a background-color-removal process using a first background color level, and
   wherein if it is determined by the determination unit that the pixel value is the second highlight data, the processing unit is configured to perform a background-color-removal process using a second background color level.

6. The image-processing apparatus according to claim 1, further comprising a region determination unit configured to determine a region attribute of a pixel of the color image data,
   wherein the processing unit is configured to determine a background color level to be used based on the region attribute determined by the region determination unit and a result of determination made by the determination unit.

7. The image-processing apparatus according to claim 6, wherein if the region determination unit determines that the pixel value is halftone-dot data or character data and the determination unit determines that the pixel value is the highlight information, the processing unit performs a background-color-removal process, using the highlight-area background color level, on a pixel having the pixel value.

8. The image-processing apparatus according to claim 7, wherein if the region determination unit determines that the pixel value is neither halftone-dot data nor character data, the processing unit performs a background-color-removal process, using a background color level used in a normal copying operation, on a pixel having the pixel value.

9. The image-processing apparatus according to claim 1, wherein the highlight information includes at least one of highlight cyan or highlight magenta.

10. A method for performing a background-color-removal process on color image data, the method comprising:
    determining whether a pixel value of the color image data is highlight information to be reproduced using a light color material;
    performing, using a processor, a background-color-removal process, using a highlight background color level, on a pixel having a pixel value determined to be the highlight information; and
    performing, using a processor, a background-color-removal process, using a background color level that is lower in luminance than the highlight background color level, on a pixel having a pixel value determined not to be the highlight information.

11. The method according to claim 10, wherein the highlight background color level is a white level or is close to the white level.

12. A computer-readable storage medium storing a control program for causing a computer to perform a method for performing a background-color-removal process on color image data, the method comprising:
    determining whether a pixel value of the color image data is highlight information to be reproduced using a light color material;
    performing a background-color-removal process, using a highlight background color level, on a pixel having a pixel value determined to be the highlight information; and
    performing a background-color-removal process, using a background color level that is lower in luminance than the highlight background color level, on a pixel having a pixel value determined not to be the highlight information.

* * * * *